United States Patent [19]

Kumar

[11] Patent Number: 5,748,677
[45] Date of Patent: May 5, 1998

[54] REFERENCE SIGNAL COMMUNICATION METHOD AND SYSTEM

[76] Inventor: Derek D. Kumar, 2313 Blackthorn Dr., Champaign, Ill. 61821

[21] Appl. No.: 586,214

[22] Filed: Jan. 16, 1996

[51] Int. Cl.$^6$ .................................................. H04B 15/00
[52] U.S. Cl. .................. 375/285; 375/260; 375/362; 375/229; 375/355
[58] Field of Search .................. 375/260, 362, 375/363–366, 285, 296, 346, 326, 229, 355; 370/522, 525, 526, 527, 528

[56] References Cited

U.S. PATENT DOCUMENTS

| | | | |
|---|---|---|---|
| 4,599,732 | 7/1986 | Lefever | 375/346 |
| 5,073,898 | 12/1991 | Endo et al. | 375/200 |
| 5,081,645 | 1/1992 | Resnikoff et al. | 375/210 |
| 5,184,135 | 2/1993 | Paradise | 375/208 |
| 5,278,826 | 1/1994 | Murphy et al. | 375/200 |
| 5,311,541 | 5/1994 | Sanderford, Jr. | 375/201 |
| 5,327,496 | 7/1994 | Russell et al. | 375/210 |
| 5,371,760 | 12/1994 | Allen et al. | 375/210 |
| 5,406,551 | 4/1995 | Saito et al. | 370/203 |
| 5,412,620 | 5/1995 | Cafarella et al. | 340/850 |
| 5,414,734 | 5/1995 | Marchetto et al. | 375/267 |
| 5,436,599 | 7/1995 | Franson et al. | 375/306 |
| 5,465,396 | 11/1995 | Hunsinger et al. | 455/61 |
| 5,469,452 | 11/1995 | Zehavi | 371/43 |
| 5,471,497 | 11/1995 | Zehavi | 375/200 |
| 5,546,420 | 8/1996 | Seshadri et al. | 375/200 |
| 5,561,849 | 10/1996 | Mankovitz | 455/45 |
| 5,592,471 | 1/1997 | Briskman | 375/200 |
| 5,615,227 | 3/1997 | Schumacher, Jr. et al. | 375/206 |

FOREIGN PATENT DOCUMENTS

WO9602101  1/1996  WIPO .

OTHER PUBLICATIONS

R.L. Pickholtz, D.L. Schilling, and L.B. Milsteen, "Theory of Spread–Spectrum Communications –A Tutorial", IEEE Transactions on Communications, vol. 30, No. 5, pp. 855–884, May, 1982.

W.C.Y. Lee, *Mobile Communications Design Fundamentals*. Indianapolis, Indiana: Howard W. Sams & Co., 1986, pp. 26–36.

W.Y. Zou and Y. Wu "COFDM: An overview", IEEE Transactions on Broadcasting, vol. 41, No. 1, pp. 1–8, Mar. 1995.

W.T. Webb and L. Hanzo. *Modern Quadrature Amplitude Modulation*. London: Pentech Press Ltd., 1994, pp. 266–269, pp. 277–278, pp. 292–319.

J.L. Ramsey, "Realization of Optimum Interleavers", IEEE Transactions on Information Theory, vol. 16, No. 3, pp. 338–345, May 1970.

G.R. Cooper and C.D. McGillem. *Modern Communications and Spread Spectrum*. New York: McGraw Hill, Inc., 1986, pp. 345–373, pp. 206–210.

(List continued on next page.)

*Primary Examiner*—Tesfaldet Bocure
*Attorney, Agent, or Firm*—Myers Liniak & Berenato

[57] ABSTRACT

A method and system are provided for the transmission and reception of a varying reference signal together with a data-modulated signal in a communication system. The reference signal is modulated by multiplying it by a predetermined reference value sequence and is summed together with the data-modulated signal in the transmitter system. The reference signal and reference value sequence generators are identically embodied in both the transmitter and receiver systems. The receiver system determines an estimate of the transmitted reference signal by canceling the effect of the reference signal modulation. The estimated reference signal may be removed from the received signal prior to demodulation of the data-modulated signal by subtracting the unmodulated reference signal estimate, which is multiplied in the receiver system with the known reference value sequence.

14 Claims, 9 Drawing Sheets

Microfiche Appendix Included
(1 Microfiche, 83 Pages)

OTHER PUBLICATIONS

H. Murata, S. Yoshida, and T. Takeuchi, "Performance of Adaptive Equalizer Using Iterative Application of Viterbi Algorithm", Electronics and Communications in Japan, Part I, vol. 77, No. 4, pp. 103–110, 1994.

R.A. Scholtz, "The Origins of Spread–Spectrum Communications", IEEE Transactions on Communications, vol. 30, No. 5, pp. 822–854, May 1982.

A. Molina, P.C. Fannin, and J. Timoney, "Generation of Optimum Excitation Waveforms for Mobil Radio Channel Sounding," IEEE Transactions on Vehicular Technology, vol. 44, No. 2, pp. 275–279, May, 1995.

P.W. Baier, K. Dostert, and M. Dandit, "A Novel Spread–Spectrum Receiver Synchronization Scheme Using a Saw–Tapped Delay Line", IEEE Transactions on Communications, vol. 30, No. 5, pp. 1037–1047, May, 1982.

K. A. Hamied, M. Rahman, and M.S. El–Hennawey, "A New Channel Estimator For Fast Start–Up Equalization," IEEE Transactions on Communications, vol. 39, No. 2. pp. 177–181, Feb. 1991.

S. Pupolin and L.J. Greenstein, "Digital Radio Performance When the Transmitter Spectral Shaping Follows the Power Amplifier," IEEE Transactions on Communications, vol. 35, No. 3, Mar. 1987.

REFERENCE SIGNAL COMMUNICATION METHOD AND SYSTEM

This invention relates to a method and system for transmitting and receiving a reference signal together with a modulated subcarrier signal in a digital communication system. The simultaneously transmitted reference signal, which is combined with a data modulated subcarrier signal, may be used as an RF channel probe in the determination of the propagation characteristics of free-space, through which the RF signals traverse, and/or for synchronization purposes. More particularly, this invention relates to the transmission and reception of a reference signal, wherein the reference signal is multiplied by a sequence of values known to the transmitter and receiver system which is constant within a reference signal interval, but varies across a plurality of reference signal intervals. The processing of the reference signal in the receiver reduces the effects of nonlinear distortion and stationary interference on the recovered reference signal in the receiver, while also causing an increase in the SNR of the received reference.

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the U.S. Patent and Trademark Office herewith in the form of a microfiche appendix including numerous frames, one of which being a title frame. The microfiche appendix is entitled REFERENCE SIGNAL COMMUNICATION METHOD AND SYSTEM and includes one (1) microfiche and eighty-three (83) frames.

BACKGROUND OF THE INVENTION

The function of a digital communication system is to convey bit information from the transmitter to one or a plurality of receivers. The transmitter system generates analog signals, for example, radio-frequency (RF) electromagnetic fields, which represent encoded digital information (bit) sequences by the process of modulation. The analog signals propagate through a medium, such as free-space, to the receiver. The receiver system completes the communication system link, recovering the encoded bit sequences by demodulating the received signal.

The propagation characteristics of the medium through which the signals traverse are important factors in the optimum design of a communication system. The medium affects (distorts) the transmitted signal in different ways, for example, by altering the amplitude and/or phase of the frequency components which together make up the signal. In some systems, the most important characteristic of the propagation medium is the attenuation of the RF signal amplitude along the signal path. However, the causes of the distortion are numerous, for example: galactic and atmospheric noise; ignition (spark or impulse) noise due to operating machinery; interference from other radio-frequency sources; and multipath propagation due to the reception of signal paths other than the line-of-sight (LOS) path.

In mobile communication systems, multipath propagation may be a primary cause of distortion in the received RF signal, especially in circumstances where there are obstructions in the signal path between the transmitter and receiver systems. Multipath is caused by the simultaneous reception of signals which result from the RF propagation from the transmitter through the medium with different paths. The varying path lengths cause differences in the respective received signals' relative delay, amplitude, and/or phase, which combine approximately linearly at the receiver. The contributions of the paths sum together and cause constructive and/or destructive interference. In general, multipath is a frequency-selective phenomenon; the deleterious effects vary with frequency.

A modulation method which is used to combat multipath propagation is "spread spectrum" [reference: R. L. Pickholtz, D. L. Schilling, and L. B. Milstein, "Theory of spread-spectrum communications—a tutorial," *IEEE Transactions on Communications*, Vol. 30, No. 5, pp. 855–884, May 1982]. In a spread spectrum communication system, the bandwidth occupied by a digital data message is expanded (spread) in the transmitter by multiplying the data message by a spreading signal or sequence. The spreading effect is collapsed in the receiver by the process of correlation. Since multipath is frequency-selective, only part of the spread signal is significantly perturbed. Another wideband communication method is Time-Division Multiplexing (TDM), in which the information baud interval is greater than the duration of the signals, typically short-duration spectrally-shaped pulses. In TDM, echoes of the transmitted signal may not substantially overlap with the LOS signal (i.e. cause distortion) if the pulse length is short compared to the multipath delay.

In general, wideband modulation methods may be more robust to multipath compared to narrowband modulation methods because the transmitted signals are less susceptible to the most severe narrowband destructive interference (attenuation) of the received signal. In mobile communication systems, the "coherence interval" is a characteristic of the RF propagation channel that describes the length of time over which the effects of multipath delay are strongly correlated. There is a corresponding "coherence bandwidth". If the bandwidth occupied by the transmitted signal is larger than the coherence bandwidth, then the signal is less susceptible to the effect of catastrophic fading due to multipath propagation.

A disadvantage of wideband modulation methods is that the transmitted signal may be significantly distorted by the RF channel as a result of the frequency-selectivity of the medium in multipath. For example, in free-space RF propagation, the received signal in multipath may be modeled by an approximately linear equation. If the transmitted signal is described as $T(\tau)$, where the argument $\tau$ represents a time-index, and if the received signal is described as $R(\tau)$, then $R(\tau)$ may be approximated as the linear summation of replicas of $T(\tau)$, with varying delays $\tau_k$, amplitudes $\alpha_k$, and phases $\Theta_k$. In other words, over the k different paths, $R(\tau)$ is given by:

$$R(\tau) = \sum_k \alpha_k \cdot e^{j\Theta_k} \cdot T(\tau - \tau_k) \tag{1}$$

In general there is an uncountable number of propagation paths, but only those with significant amplitude (e.g. within about 15 decibels of the largest path) are considered. If the transmitted signal $T(\tau)$ is an impulse function (also known as the Dirac delta function), then the resulting response $R(\tau)$ is known as the RF channel "impulse response". The impulse response is useful because it represents the RF channel characteristics and is independent of the particular transmitted signal. The distortion in the received signal caused by the RF channel for an arbitrary transmitted signal may then be estimated by mathematically convolving the RF channel impulse response with the transmitted signal.

The linear model shown in Equation (1) has been found to represent the RF channel where the effects of multipath propagation are well-predicted by geometric ray-tracing. This type of multipath may be referred to as "specular" or deterministic multipath. Another form of multipath is "diffuse", where the summation over the various paths is too complicated to represent in a deterministic formula. Diffuse multipath (also known as stochastic multipath) is typically modeled with statistical distributions, for example, the "Rayleigh" distribution when there is no line-of-sight (LOS) signal propagation path, and the "Rician" distribution when there is a LOS path [reference: W. C. Y. Lee. *Mobile Communications Design Fundamentals*. Indianapolis, Ind.: Howard W. Sams & Co., 1986, pp. 26–36].

It is known that there are advantages to generating a reference signal which is simultaneously transmitted along with the information-bearing signal in a transmitter system. The reference signal is separated from the information signal in the receiver system. There are various uses for the reference signal in the receiver system, for example, to accomplish baud and carrier synchronization with the transmitter system. The reference signal may also be used in determining the RF propagation impulse response in order to facilitate equalization in the receiver system of the frequency-selective channel characteristics.

FIG. 1 is a block diagram of a prior art transmitter system for a communication system with a simultaneously transmitted reference signal. Source message 1 is the digital bit sequence which is to be conveyed from the transmitter to one or a plurality of receiver systems through the medium, which may be free-space. The source message is typically scrambled by scrambler 3 to appear random and in order to eliminate long sequences of consecutive binary ones or zeroes in the original source message, resulting in approximately equal probabilities of occurrence for the binary digits zero and one. The scrambling method establishes a bijection which may be inverted in the receiver system. Source scrambling is important for optimum performance of the error control coding. The scrambling function 3 is accomplished by multiplying the source bit message by certain types of binary polynomials, typically m-sequences, using binary arithmetic [reference: W. T. Webb and L. Hanzo. *Modern Quadrature Amplitude Modulation*. London: Pentech Press, Ltd., 1994, pp. 266–268].

Redundancy may be added to the scrambled source message by error correction code (ECC) encoder 5. Redundancy may be generated as concatenated codeword symbols in addition to the scrambled source message (known as "systematic" coding) or by generating an entirely different message (known as "nonsystematic" coding). Typical ECC methods are known as "convolutional" coding and "block" coding and combinations thereof, known as "concatenated" coding. The ECC encoder 5 increases the size of the source message by the amount of the redundancy. For a specific bit rate throughput of the communication system, the incorporation of ECC methods typically reduces the available data message throughput. This decrease in throughput is generally thought to be acceptable because of the significant increase in the overall reliability of the communication system, as measured by the bit error rate in the receiver, as a result of the ECC code. In certain modulation methods known as "trellis-coded" modulation (TCM), the number of modulation states is increased to accommodate the ECC coding overhead.

After ECC encoding 5, the encoded scrambled message is propagated to optional interleaver 7. The function of interleaver 7 is to shuffle the encoded bit sequence so that adjacent bits ("bit" interleaving) or groups of adjacent bits ("symbol" interleaving) in the encoded message are widely dispersed in the interleaved message. Interleavers are typically implemented with random-access memory (RAM) and a shuffling algorithm [reference: J. L. Ramsey. "Realization of optimum interleavers," *IEEE Transactions on Information Theory*, Vol. 16, No. 3, pp. 338–345, May 1970]. Interleaving is a method of time-diversity which is sometimes used in mobile communication systems to combat burst errors, where there are localized time intervals with high error rates. By shuffling the bit sequences in interleaver 7 and subsequently reversing the shuffling in deinterleaver 43 (see FIG. 3), consecutive bit errors caused by the correlation effects of the RF channel are dispersed over a wider time interval. Interleaving 7 does not change the intrinsic bit error rate; it only affects the distribution of errors. Typical error correction methods, for example, convolutional codes, exhibit much better (lower) decoded error performance when the error distribution is approximately random and uncorrelated across interleaver symbols. Thus, interleaver 7 effects to cause a random error distribution after corresponding deinterleaving in the receiver, despite the presence of correlated burst errors due to the RF channel.

A transmitter system may convey bit information, in the form of signals, to the receiver system, with one transmitted signal or by simultaneously multiplexing and transmitting a plurality of signals. The function of converting the encoded and interleaved bit sequence into a digital signal representation is accomplished by composite signal modulator 11, which is shown in detail in prior art FIG. 2. If a plurality of simultaneously multiplexed signals is implemented in the transmitter system, then the encoded bit sequence is divided into groups of bits, each group consisting of one or a plurality of bits. Each group of bits may be independently modulated. The amount of time corresponding to the duration (extent) of the signal for the bit information in one group is the "baud interval". Typically, in a multiplexed transmitter system, the signal lengths are all about equal and so the baud interval is characteristic of the overall system. The encoded bit sequence is subdivided into groups of bits by serial-to-parallel converter 9 which are subsequently modulated independently in composite signal modulator 11. If only one signal is transmitted (not including the reference signal), then serial-to-parallel converter 9 is not needed and only one bit group is propagated to composite signal modulator 11.

A block diagram of prior art composite signal modulator 11 is shown in prior art FIG. 2 for the FIG. 1 transmitter system with a simultaneously transmitted reference signal. The bits or groups of bits 21 from serial-to-parallel converter 9 are propagated to one or a plurality of subcarrier modulators 17. Each subcarrier modulator 17 generates a distinct modulated signal 19. The implementation of subcarrier modulators 17 depends upon the modulation method of the communication system. For example, if the communication system implements a plurality of simultaneously multiplexed spread-spectrum signals (e.g. Code-Division Multiple Access), each of which is modulated with "antipodal" (also known as bipolar, bi-phase, BPSK) data modulation, then each subcarrier modulator 17 corresponds to a subsystem with a spreading signal generator and a multiplier with a factor of plus one or minus one [reference: R. L. Pickholtz, et. al., ibid.].

The plurality of modulated signals 19 generated by subcarrier modulators 17 are summed together linearly to form the data-modulated composite signal by summer 23 which may be implemented as an adder (digital implementation) or as a linear combiner (analog implementation). In a communication system with multiplexed narrowband signals, for example, Orthogonal Frequency Division Multiplexing (OFDM) modulation, the function of subcarrier modulators 17 and summer 23 may instead be accomplished simultaneously by computing the Inverse Fast Fourier Transform (IFFT) [reference: W. Y. Zou and Y. Wu, "COFDM: an overview," *IEEE Transactions on Broadcasting*, Vol. 41, No. 1, pp. 1–8, March 1995]. The summation of the modulated subcarrier signals, representing the encoded source message without the reference signal, is known as composite subcarrier signal 20.

For the FIGS. 1–2 prior art system with a simultaneously transmitted reference signal, reference signal 27 is linearly summed with composite subcarrier signal 20 at 23 to form overall composite signal 22. Since summation is commutative and associative, the subcarrier signals may be first separately summed and then combined with the reference signal or combined simultaneously. In prior art composite signal modulator 11, the reference signal is generated by unmodulated reference generator 25. The extent of the reference signal (i.e. its period) is about one subcarrier signal baud interval. The implementation of unmodulated reference signal generator 25 depends upon the characteristics of the reference signal waveform.

Prior art reference signal waveforms include, but are not limited to: m-sequence spreading signals, also known as pseudonoise or PN-sequences or maximal length sequences, including variations such as Gold codes; chirped (linear frequency-modulated) signals; sinusoidal signals, also known as pilot signals; and reference signals composed of the subcarrier signals. Typically, read-only-memory (ROM) look-up tables are used for arbitrary reference signal digital implementations. In some systems, the reference signal is an m-sequence or variation thereof, which may be generated with linear feedback shift-registers (LFSRs).

While signal 19 generated by each subcarrier modulator 17 depends upon data sequence 21 to be transmitted, reference signal 27 in prior art composite signal modulator 11 is (i) unrelated to the transmitted bit sequence in the source message and (ii) does not change from baud interval to baud interval (i.e. it is stationary). The combined signal 22, representing the subcarrier data signals together with the reference signal, is converted at 13 to an analog representation suitable for RF emission. This process may be described as modulation, for example, frequency-modulation. However, this type of modulation is unrelated to the instant invention. In this disclosure, modulation of the reference signal refers to the alteration of the reference signal's characteristics across a plurality of baud intervals.

For example, when a prior art PN-sequence is used as a reference signal 27, the signal components which may make up the PN-sequence may be described as being modulated, but this is unrelated to invention. A PN-sequence is composed of a plurality of "chip" signals, whose polarity is determined by certain types of binary polynomials; hence, the chip signals are said to be modulated. However, the individual chip signals are not the reference signal; the entire sequence of chip signals is. Thus, although the chip signals are described in certain prior art patents as being modulated, the overall PN-sequence composed of the plurality of chip signals, is unmodulated, for example, as described by Zehavi in U.S. Pat. No. 5,471,497 where the reference signal is known as a "pilot channel". For the PN-sequence itself to be considered as modulated for purposes of this disclosure, the entire sequence would have to be further processed, for example, by multiplying by a varying scalar value.

In the FIG. 1 transmitter system, after summation 23, resulting signal 22 from composite signal modulator 11 is a digital representation of the overall composite signal to be transmitted, including the unmodulated reference signal. The digital signal is converted to an analog representation by digital-to-analog converter (DAC) 13 and translated to the RF frequency for power amplification, filtering, and free-space emission by RF up-converter 15.

In some systems, the characteristics of the prior art reference signal 27 generated by unmodulated reference generator 25 are typically designed to be similar to the characteristics of the signals generated by the subcarrier modulators. Since a reference signal may be transmitted in order to facilitate probing of the RF channel propagation characteristics for use in the receiver system, it may be advantageous if the bandwidth occupied by the reference signal is similar to that of the composite subcarrier signal, especially for adaptive equalization in the receiver. For example, if spread-spectrum or wideband modulation methods are implemented in the subcarrier modulators, reference signal 27 is typically a wideband signal for purposes of equalization. However, if the reference signal is used only for synchronization or carrier frequency tracking, in some circumstances, reference signal 27 may be narrowband even if the subcarrier signals are wideband.

For systems with narrowband composite subcarrier signals (with or without simultaneous multiplexing), reference signal 27 may be known as a "pilot" signal. A pilot signal for use in the receiver synchronization of narrowband systems is also typically narrowband. This method may be known as "transparent-tone-in-band" (TTIB) [reference: W. T. Webb and L. Hanzo, ibid., pp. 292–319]. In some circumstances, the pilot signal for a simultaneous multiplex of narrowband signals may be wideband, spanning the frequency range including all of the individual narrowband subcarrier signals, as described in U.S. Pat. No. 5,465,396 to Hunsinger, et. al.

The transmitted unmodulated reference signal may act as an RF channel probe in the prior art. When the reference signal bandwidth is substantially greater than the bandwidth required by the composite subcarrier signal, then energy is wasted by generating reference signal components at frequencies unrelated to the reception of the composite subcarrier signal, which represents the desired source message. For a fixed transmitter power, less energy for the reference signal is then available in the useful frequency range and the reliability of the received reference signal may be reduced. On the other hand, when the reference signal bandwidth is substantially more narrow than the bandwidth of the composite subcarrier signal, then there may be significant ambiguity in the receiver system as to the effects of the RF channel on certain frequencies beyond the extent of the reference signal, but within the bandwidth of the composite subcarrier signal, which may degrade equalizer and synchronization performance.

Whether the reference signal is used for equalization and/or for synchronization purposes, it is important that the reference signal not interfere with the demodulation of the composite subcarrier signal in the receiver system. In narrowband systems with narrowband subcarrier signals and a narrowband reference signal, the frequencies of the subcarrier signals and the reference signal may be determined to be similar but frequency-orthogonal to one another (e.g. separated by $1/\Delta T$ in OFDM where $\Delta T$ is the baud interval). The signals are separated from one another in the overall composite signal by conventional frequency-specific "bandpass" filtering with either analog or digital implementations (e.g. Fast-Fourier Transform).

In wideband systems, it may not be possible to use different frequency regions for the reference and subcarrier signals since both signals may occupy the available bandwidth. In this circumstance, it is known that the reference signal may be chosen to be "orthogonal" to the subcarrier signals. Orthogonal signals may be separated from each other by the process of correlation. Orthogonal signals have a crosscorrelation sum magnitude of about zero when the phases of the signals are properly synchronized. Frequency-orthogonal signals are a particular class of orthogonal signals whose mutual orthogonality property is insensitive to relative phase differences. In general, two orthogonal signals may only be frequency-orthogonal when the frequency spectra of the two signals do not significantly overlap. Thus, frequency-orthogonal signals are typically narrowband.

A disadvantage of prior art communication systems with a wideband composite subcarrier signal 20 and a wideband reference signal 27 is that the orthogonality property between the composite subcarrier signal and the reference signal may be disturbed by frequency-selective phenomena such as multipath propagation. The reference signal may then cause significant interference to the composite subcarrier signal in the receiver or vice versa.

For a fixed amount of transmitter power, the simultaneous transmission of reference signal 27 together with composite subcarrier signal 20 reduces the transmitter power that is available for the composite subcarrier signal. This degrades the performance of the receiver in the reception of composite subcarrier signal 20 because it reduces the subcarrier signal-to-noise (SNR) ratio. The receiver SNR directly determines the receiver error rate. Increasing the fraction of the total transmitted power represented by the composite subcarrier signal improves the robustness of the received subcarrier signal at the expense of a decrease in the robustness of the received reference signal. Since reference signal 27 may be used for equalization, demodulation, and/or synchronization in the receiver system, insufficient SNR in the reference signal may result in significant performance degradation of the receiver system. Conversely, increasing the reference signal power in the transmitter reduces the immunity of received subcarrier signals 20 to interference and noise, which increases the demodulated bit error rate. Therefore, the allocation or balancing of power between the reference signal and subcarrier signals requires a compromise.

In the prior art, the power allocated to reference signal 27 is significantly less than the power allocated to composite subcarrier signal 20. The power allocation may be controlled by determining the relative energies of composite subcarrier signal 20 and unmodulated reference signal 27 prior to summation 23 in the FIG. 2 composite signal modulator 11. For example, if the power of the reference signal is desired to be one-fourth (¼) of the power of the composite subcarrier signal, and if the normalized energy of the digital representation of composite subcarrier signal 20 is about equal to that of unmodulated reference signal 27, then reference signal 27 is further reduced prior to summation 23 with the composite subcarrier signal by multiplying the reference signal by a linear amplitude scale factor of one-half (½). The scale-factor may be incorporated in the implementation of unmodulated reference signal generator 25. The total power in overall composite signal 22 is the sum of the powers of reference signal 27 and composite subcarrier signal 20 if the signals are orthogonal.

FIG. 3 is a block diagram of the prior art receiver system for the FIGS. 1–2 transmitter system. The received RF signal, representing the composite subcarrier signal 20 and reference signal 27 together (i.e. the overall composite signal), is first amplified and filtered with a bandpass filter in RF tuner 29 to remove interference and noise which is outside of the bandwidth of the transmitted overall composite signal. The received RF signal is typically frequency-translated to a lower frequency, known as the intermediate frequency (IF), for further processing, which simplifies the implementation. In some digital systems, the IF frequency is zero, which requires that the remaining processes be implemented with complex digital arithmetic (real and imaginary components). The tuner also accomplishes the function of automatic gain control (AGC) so that the received signal energy is made to be approximately constant for subsequent processing. These combined RF functions are abbreviated as RF tuner 29.

In many conventional FIG. 3 systems, the received signal is converted (quantized) from an analog representation (e.g. voltage or current) to a digital representation by analog-to-digital converter (ADC) 31. The number of bits in the implementation of ADC 31 is chosen to preserve sufficient dynamic range in the digitized signal so that the irreducible error level caused by ADC quantization noise does not significantly degrade the receiver system performance. Typically, the number of bits is between six (6) and twelve (12), inclusive. The received and quantized signal is made synchronous with the transmitter in signal baud frequency and carrier frequency by baud clock recovery 33 and carrier frequency recovery 35 subsystems. These functional blocks may be implemented with early/late or pulse-swallowing algorithms, phase-locked loops (PLLs) and voltage-controlled oscillators (VCOs), and/or frequency-lock loops (FLLs), and other methods, all of which are known. The overall function of recoveries 33 and 35 is to eliminate frequency offsets between the receiver and the transmitter, which may be caused by variation in components and the effect of Doppler frequency shift. The synchronization also establishes the proper timing (i.e. phase relationship) for demodulation of the received composite subcarrier signal. The frequency of the sampling clock for ADC 31 is typically synchronous with the frequency of the signal baud (i.e. reciprocal of the baud interval) and is a integer multiple of the baud frequency, for example, a sampling frequency of 1.536 MHz (million ADC samples/sec) and a baud clock frequency of 2 kHz (1.536 MHz divided by 2 kHz is integer 768).

In general, four types of synchronization are required for proper operation of a digital communication system: baud frequency synchronization, baud phase synchronization, carrier frequency synchronization, and carrier phase synchronization. The signal baud frequency in the transmitter and receiver systems is typically established by dividing-down a known timing source (master clock), which may be implemented, for example, with a crystal oscillator. The clock is divided by an integer or rational number. Although the nominal baud frequencies implemented in the transmitter and receiver systems are equal, variation in components and intrinsic timing instabilities results in some uncertainty in the nominal master clock frequency (typically within about 100 parts-per-million). The deviations result in initial differences in the baud frequencies established in the transmitter and receiver systems. Further deviation is caused by Doppler frequency shift, when either the transmitter or receiver is in motion relative to the other. Once frequency synchronization is established, phase synchronization between the transmitter and receiver baud clocks is typically required for proper operation of the demodulation system. In communication systems with matched-filter (correlation) demodulation, a metric known as the correlation sum is determined about a confined interval known as the "sampling point". Phase synchronization of the transmitter and receiver baud intervals ensures that the sampling point is properly established, for example, about the center or midpoint of the baud interval.

Differences in baud frequency between the transmitter and receiver system will cause the received signal to precess (i.e. roll). A prior art method to accomplish baud frequency synchronization in the receiver system is to increase or decrease the receiver baud frequency, for example, with a voltage-controlled oscillator (VCO) or numerically-controlled oscillator (NCO), until the precession is eliminated. Prior art transmitted reference signal 27 may facilitate baud clock recovery by providing an unvarying probe signal, whose rate of precession can be measured over a plurality of baud intervals. Furthermore, the received reference signal may be used to determine the proper baud phase relationship. For example, by computing the crosscorrelation of the received reference signal and a stored replica of the undistorted reference signal (embodied identically in the transmitter and in the receiver), and then tracking the position of the maximum crosscorrelation function magnitude, and adjusting the baud frequency, it is possible to maintain sample point centering.

Baud clock recovery 33, possibly making use of the received reference signal, corrects for variations in baud frequency and phase between the transmitter and receiver systems. In the prior art FIG. 3 receiver, the carrier recovery 35 function compensates for variations in the received signal RF carrier signal frequency and phase. RF carrier frequencies are typically substantially larger than the baud frequencies (e.g. 100 MHz carrier and 19 kHz baud). Thus, the effects of component variation, instability, and Doppler frequency shifts due to relative motion are substantially increased. As a result, carrier frequency recovery function 35 typically operates with a much higher throughput compared to baud clock recovery synchronization function 33. In particular, the relative phase of the carrier signal across baud intervals may change significantly over a distance as small as about a carrier wavelength, which may correspond to no more than a few meters (e.g. the RF wavelength at 100 MHz is about 3 meters). In mobile communication systems at high relative velocities between the transmitter and receiver, the interval of time corresponding to a wavelength is typically less than about about 100 milliseconds (for VHF frequencies and typical automobile speeds) and may be significantly less than about ten milliseconds at high carrier frequencies (e.g. L-band).

In receivers for some prior art communication systems, known as "incoherent" receiver systems, no attempt is made to determine the RF carrier signal phase. The contribution of the received signal components along both orthogonal basis phasors (known as the "in-phase" and "quadrature" components) are summed together quadratically, resulting in only phasor magnitude information. The frequency of the carrier signal is tracked, but it typically deviates at a much smaller rate than the phase. In systems with a narrowband pilot reference signal, an analog or digital embodiment of a phase-locked loop (PLL) may be used to simultaneously accomplish the functions of frequency and phase tracking of the RF carrier frequency. In wideband systems, for example, spread spectrum, various coherent frequency-tracking methods have been implemented including: squaring loops, Costas loops, delay-locked loops, and tau-dither loops [reference: G. R. Cooper and C. D. McGillem. *Modern Communications and Spread Spectrum*. New York: McGraw-Hill, Inc., 1986, pp. 345–373]. The tracking algorithms typically do not require the use of the transmitted reference signal in addition to the composite subcarrier data signal; instead, an estimate of the unmodulated carrier signal is determined by removing the effects of the source message data-modulation (i.e. by squaring in systems with constant envelope and BPSK modulation). The received reference signal may be used in the above-mentioned tracking methods and has the advantage that the steps required to remove data-modulation are not required, the reference signal being already unmodulated.

The digitized and synchronized signal is optionally equalized by adaptive equalizer 37 in order to partially correct for the effects of RF signal dispersion caused by the frequency-selective characteristics of the RF propagation channel. Small frequency and phase deviations may also be tracked by an adaptive equalizer. Equalizer 37 may be implemented with a finite-impulse response (FIR) transversal filter or an infinite-impulse response (IIR) recursive filter or a combination thereof. The coefficients of the equalization filter are determined by a tap-weight update algorithm and are updated at a rate sufficient to reasonably track changes in the RF propagation characteristics. Some prior art methods for linear equalization include, but are not limited to, minimum mean square estimation (MMSE), least mean square (LMS), and recursive least square (RLS) algorithms, all of which are known.

In some systems, the equalization function 37 is not performed until after demodulation of the subcarrier signal. In general, this method is known as nonlinear decision-feedback equalization (DFE). In systems with DFE, the tap-update algorithm makes use of the estimates of the demodulated encoded message bits. Systems may use equalization both antecedent to and subsequent to demodulation. In systems with combined equalization, linear equalization prior to demodulation may be used to mitigate pre-echoes (also known as precursor intersymbol interference) and to effect truncation of the RF channel impulse response. Nonlinear equalization after demodulation may be used to mitigate latent echoes.

It is known that the received reference signal may be used by the tap-weight update algorithm implemented in the linear and/or nonlinear equalizer. If the reference signal is embodied in both the transmitter and receiver systems, then the received reference signal, after having been separated from the received composite subcarrier signal, corresponds to the effect of the RF propagation channel on the unaffected (ideal) reference signal, for example, as shown by Equation (1). The RF channel impulse response may then be determined by the mathematical process of de-convolution. In Equation (1), the known entities are the received reference signal, $R(\tau)$, and the transmitted signal $T(\tau)$ without distortion. By de-convolution, Equation (1) is solved for the various delays $\tau_k$, amplitudes $\alpha_k$, and phases $\Theta_k$. Having determined the RF channel impulse response, DFE or Viterbi equalization/prediction [reference: H. Murata, S. Yoshida, and T. Takeuchi, "Performance of adaptive equalizer using iterative application of Viterbi algorithm," *Electronics and Communications in Japan*, Part I, Vol. 77, No. 4, pp. 103–110, 1994] of the demodulated signal may be used to determine the bit sequence which is most likely to have been transmitted. Instead of determining the RF channel impulse response by de-convolution, the tap-update algorithm may directly determine the equalizer tap weights by solving a matrix "inverse" equation problem by, for example, the Levinson-Durbin algorithm for linear equalization, where the equalizer taps weights are computed which minimize the squared error of the target (ideal reference) crosscorrelation function.

In the prior art FIG. 3 receiver system, the equalized signal is propagated to composite signal demodulator 39. Composite signal demodulator 39 determines the estimated bit sequences which are represented by the received composite subcarrier signal; the function is inverse to that of composite signal modulator 11 in FIG. 1.

After demodulation, the estimated bits are propagated to parallel-to-serial converter 41. The resulting serial sequence of bits is shuffled by deinterleaver 43, which reverses the effect of the shuffling in interleaver 7 in the FIG. 1 transmitter system. After deinterleaving, the error distribution is approximately random and uncorrelated across interleaver symbols. The bit estimates, which may include additional soft-decision reliability information, are decoded by ECC decoder 45, which reverses the effect of ECC encoder 5 in the transmitter system. The resulting decoded bit sequence is made smaller than the bit sequence prior to ECC decoding by the code rate. The bit error rate of the decoded bit sequence is substantially lower than that of the estimated bit sequence determined in composite subcarrier demodulator 39, prior to decoding, as the result of the redundancy information. Finally, the decoded bit sequence is descrambled by bit descrambler 47, which reverses the effect of scrambler 3 in the transmitter system. The resulting sequence of bits is message bit estimate 49, which substantially resembles source message 1 in the transmitter system, except for the occurrence of bit errors.

In general, prior art composite signal demodulator 39 includes of one or a plurality of subcarrier demodulators. Each subcarrier demodulator corresponds to a subcarrier modulator 17 in FIG. 2. The received composite signal with optional linear equalization is the common input signal for the subcarrier demodulators. Each subcarrier demodulator determines bit estimates from the received subcarrier signal. The implementation of the subcarrier demodulators depends upon the modulation method that is implemented in the corresponding transmitter system. In a receiver system for narrowband OFDM modulation, for example, the function of the subcarrier demodulators is accomplished by computing the Fast Fourier Transform (FFT) of the received composite subcarrier signal [reference: W. Y. Zou and Y. Wu, ibid.]. In a multiplexed spread spectrum receiver system with antipodal data modulation, each subcarrier demodulator corresponds to a subsystem that multiplies the received signal by a spreading signal and sums the product signals together, which de-spreads the subcarrier signal (known as correlator or matched filter), followed by a sampler and a decision-device.

In order to make use of the reference signal in baud clock recovery 33, carrier recovery 35, equalizer 37, and/or composite signal demodulator 39, an estimate of the received reference signal is determined in the receiver system. If the reference signal estimate is used in order to determine tap weights for equalization, then for certain embodiments, the reference signal estimate is determined prior to equalization, so that the estimate shows the apparent effects of the RF channel's propagation characteristics. The received reference signal is separated from the overall received RF composite signal by reference separator 51 in the prior art FIG. 3 receiver system. The function of reference separator is to discard the component in the received signal which corresponds to the composite subcarrier signal, so that only the reference signal remains.

Reference separator 51 processes the quantized received signal samples from ADC 31. If the reference signal is frequency-orthogonal to the composite subcarrier signal, for example, with a narrowband pilot signal, then the reference signal separation may be implemented with an analog or digital embodiment of a bandpass filter. If the reference signal is time-orthogonal or time-multiplexed with the composite subcarrier signal, then the reference signal may be separated by multiplying the received signal with a gating function, which is configured to propagate the signal (i.e. the reference) for an specific interval of time. For example, the reference signal may occupy only a fraction of the complete baud interval, such as the beginning.

If the reference signal estimate, determined in the receiver, is used for equalization purposes, it may be important that the estimate accurately reflect only the propagation characteristics of the RF channel. However, in addition to the linear propagation effects given by Equation (1), the determined reference signal estimate, when compared to the ideal reference signal as implemented in the transmitter system, may be disturbed by other effects unrelated to the RF channel's propagation characteristics. For example, the reference signal estimate may be degraded by the presence of nonlinearities in the implementation of the system. In particular, it is difficult to generate high-power RF signals with a high degree of linearity.

The process of power amplification (PA) may be modeled as a sum-of-powers; in other words, if the signal prior to amplification is $T(\tau)$ with time index $\tau$, then the PA signal, labeled as $T^{PA}(\tau)$, is the sum of the desired linear signal (with greater amplitude $k_1$) and various powers $i$ ($i>1$) of the input signal with amplitudes $k_i$, typically decreasing.

$$T^{PA}(\tau)=K_1 \cdot T(\tau)+K_2 \cdot (T(\tau))^2+K_3 \cdot (T(\tau))^3+ \qquad (2)$$

The contribution of powers greater than three is often ignored. In tube-type PA devices, the squared term (power-of-two) may be significant. In the prior art reference transmitter and receiver systems, the determination of the reference signal may be distorted by the presence of even-order, for example, square-law, nonlinearities.

The determination of the reference signal estimate in the receiver is also degraded by the presence of stationary interference and offsets. For example, it is difficult to implement ADC 31 device in the FIG. 3 receiver system without generating a small offset in the quantized received signal samples. Typically, the offset does not vary substantially over short intervals of time (e.g. less than 100 milliseconds). The presence of said interference may require the transmission of the reference signal at a higher power than would be required if the stationary interference and/or offsets were not present. As described previously, it is desirable to transmit the reference signal at the lowest power at which the received reference signal estimate is determined with sufficient SNR that the performance of those subsystems which make use of the reference signal are not significantly degraded.

Prior art systems for transmitting an unmodulated spread spectrum signal together with a data-modulated spread spectrum signal in order to facilitate synchronization, equalization, and demodulation are known. According to Scholtz [(reference: R. A. Scholtz, "The origins of spread-spectrum communications," *IEEE Transactions on Communications*, Vol. 30, No. 5, pp. 822–854, May 1982], in "transmitted-reference spread-spectrum" (TR-SS), two versions of the spreading signal are transmitted simultaneously, one modulated by the source message and one unmodulated, which are separately recovered in the receiver. The replica of the spreading signal which is implemented in the receiver for a spread spectrum communication system may be described as a "reference signal", but this signal is directly related to the transmission of the source bit information and is unrelated to the use of a distinct signal for synchronization.

U.S. Pat. No. 5,184,135 to Paradise, U.S. Pat. No. 5,327,496 to Russell, et. al., U.S. Pat. No. 5,073,898 to Endo, et. al., U.S. Pat. No. 5,471,497 to Zehavi, and U.S. Pat. No. 5,371,760 to Allen describe the transmission of a reference signal which is a PN-sequence. As described previously, although the component chip signals which make up the reference signal are sometimes considered as being modulated, the PN-sequence itself, which is the reference signal, is unmodulated. A characteristic of the instant invention is that it requires particular modulation of the reference signal. U.S. Pat. No. 5,081,645 to Resnikoff, et. al., describes the use of an unmodulated reference signal, which corresponds to the calibration constant, which is transmitted together with a data-modulated composite signal composed of "wavelet" waveforms. In U.S. Pat. No. 5,412,620 to Cafarella, et. al., the reference signal consists of a series of chips in a spread spectrum signal. The sequence of chip signals is the same for all baud intervals. The transmission of a unmodulated reference signal, without consideration of the specific reference signal waveform, is prior art.

In some communication systems, reference-like information is embedded in the bit message which is conveyed from the transmitter to the receiver [reference: W. T. Webb and L. Hanzo. *Modern Quadrature Amplitude Modulation*. London: Pentech Press, Ltd., 1994, pp. 266–268]; see also U.S. Pat. No. 5,311,541 to Sanderford, Jr., U.S. Pat. No. 5,406,551 to Saito, et. al., U.S. Pat. No. 4,599,732 to LeFever, and U.S. Pat. No. 5,414,734 to Marchetto, et. al. In such systems, there is no separate reference signal. Instead, known sequences of bits (known as the "pilot" symbols, "synchronization" symbols, or "training" pattern) are periodically inserted into the transmitted bit stream. The symbols associated with the reference-information undergo similar processes as the data bits; in other words, the subcarrier composite modulation and demodulation processes. In particular, the received signal must be demodulated in order to determine bit estimates which correspond to the embedded information. The signaling waveform itself is unrelated to the use of the embedded information. A disadvantage of training patterns compared to distinct reference signals is that presence of the training patterns in the bit sequence reduces the useful (i.e. source message) bit rate throughput of the system, while a reference signal only reduces the available subcarrier signal power. Systems with bit training-sequences convey reference information through the pattern of bits determined after demodulation, and not through the characteristics of the transmitted signal itself; said systems are unrelated to the instant invention which does not require demodulation of the received reference signal.

U.S. Pat. No. 5,436,599 to Franson, et. al., describes the frequency modulation (FM) of the reference signal in the receiver. The modulation of the reference signal permits for the transmission of both high-frequency and low-frequency source information. The modulation of the reference signal in the '599 patent is directly related to the characteristics of the source information and so is unrelated to the reference signal of the invention, which is unrelated to the source message.

U.S. Pat. No. 5,465,396 to Hunsinger, et. al., discloses a multiplexed orthogonal narrowband communication system with a simultaneously transmitted reference signal. Although the individual subcarrier signals are narrowband, the reference signal, which is composed of each of the subcarriers with a prescribed polarity, is wideband. The reference signal is used to determine the sampling point in the demodulation of the subcarrier signals. U.S. Pat. No. 5,272,724 to Solomon, et. al., operates in a manner opposite to the '396 system. In the '724 system, the composite signal is wideband and the reference signal is composed of a plurality of narrowband pilot signals, which are unmodulated sinusoidal waveforms. The transmitted reference signal in the '396 and '724 systems is substantially the same for every baud interval (i.e. unmodulated) and hence differs from the instant invention.

U.S. Pat. No. 5,396,190 to Murata and U.S. Pat. No. 5,105,446 to Ravoalavoson, et. al., describe methods of improving the linearity of the transmitter system for digital signals. Improving the linearity of the transmitter system reduces the even-order nonlinear interference, but does not mitigate the deleterious effects of stationary interference, offsets, and nonlinearities in the receiver implementation. Also, transmitter linearization may require "pre-distortion", which typically reduces the available peak transmitter output power.

The described prior art systems are adversely affected by offsets, stationary interference, and the like, which may require the transmission of the reference signal at a higher power than desirable. Accordingly, it is apparent from the above that there exists a need in the reference signal art for: (i) causing a increase in the SNR of the determined reference signal in the receiver so that the reference signal may be transmitted at a lower power; (ii) reducing the effect of stationary interference and offsets on the determination of the transmitted reference signal in the receiver; and (iii) reducing the effect of system nonlinearity on the determination of the transmitted reference signal in the receiver.

SUMMARY OF THE INVENTION

This invention fulfills the above-described needs in the art by providing a method and system for the simultaneous transmission and reception of a varying reference signal together with the composite data-modulated signal which represents the source message bit information.

According to certain embodiments of this invention, the reference signal is linearly summed with the composite data-modulated signal in the transmitter system to form an overall composite signal for RF emission. However, prior to summation in the composite signal modulator, the reference signal is multiplied by a predetermined sequence known as the reference value sequence, and thus the emitted reference signal is modulated. The reference value sequence multiplied together with the unmodulated reference signal is unrelated to the source message which is conveyed from the transmitter to the receiver in the composite data-modulated subcarrier signal. The reference value sequence generator is identically embodied in both the transmitter and receiver system implementations and is thus known in both without ambiguity. According to certain embodiments, the reference value sequence affects the generated reference signal in the transmitter system for each baud interval by determining the transmitted reference signal polarity for the duration of the baud interval.

The receiver system of the invention separates the varying or modulated reference overall composite signal component from the received signal, which is the combination of the composite data-modulated subcarrier signal and the reference signal multiplied by the reference value sequence. The received signal is multiplied in the receiver system with the same reference value sequence as is generated in the implementation of the reference signal transmitter system. The effect of multiplication in the receiver is to cancel the variation in the reference signal caused by the composite signal modulator in the transmitter system of the invention. After multiplying in the receiver system, the received signal is accumulated over a plurality of baud intervals in synchronism with the reference signal baud frequency. The accumulated signal is the unmodulated reference signal estimate. The unmodulated reference signal estimate may be used to facilitate baud clock recovery, carrier frequency recovery, and/or equalization. The accumulation process causes an SNR gain in the determination of the reference signal estimate, which allows for the transmission of the reference signal at a lower power.

According to certain embodiments of the invention, the varying reference signal is removed from the received signal, which consists of the composite data-modulated subcarrier signal and the modulated reference signal. The reference signal estimate is subtracted from the received signal in the receiver system composite signal demodulator. Prior to subtraction, the reference signal estimate, which is determined as an unmodulated reference signal by the structure of the reference signal accumulator of the invention, is multiplied by the known reference value sequence in order to generate a varying reference signal estimate. The varying reference signal estimate, properly scaled, substantially cancels the additive effect of the reference signal component in the received RF signal.

The characteristics of the specific embodiments of the reference value sequence determine the advantages of invention over the use of prior art unmodulated reference signals. According to certain embodiments, when the reference value sequence substantially alternates in polarity across a plurality of baud intervals and within the accumulation interval, then the deleterious effects of slow-varying or stationary interference and even-order nonlinearities on the recovery of the reference signal are mitigated. The minimum period reference value sequence corresponds to two reference signal baud intervals with alternating signal polarity for consecutive baud intervals (i.e. multiplying the unmodulated reference signal by scale factors of plus one, minus one, plus one, minus one, and so on, alternating in consecutive baud intervals).

DETAILED DESCRIPTION OF CERTAIN EMBODIMENTS OF THIS INVENTION

Figure 1:
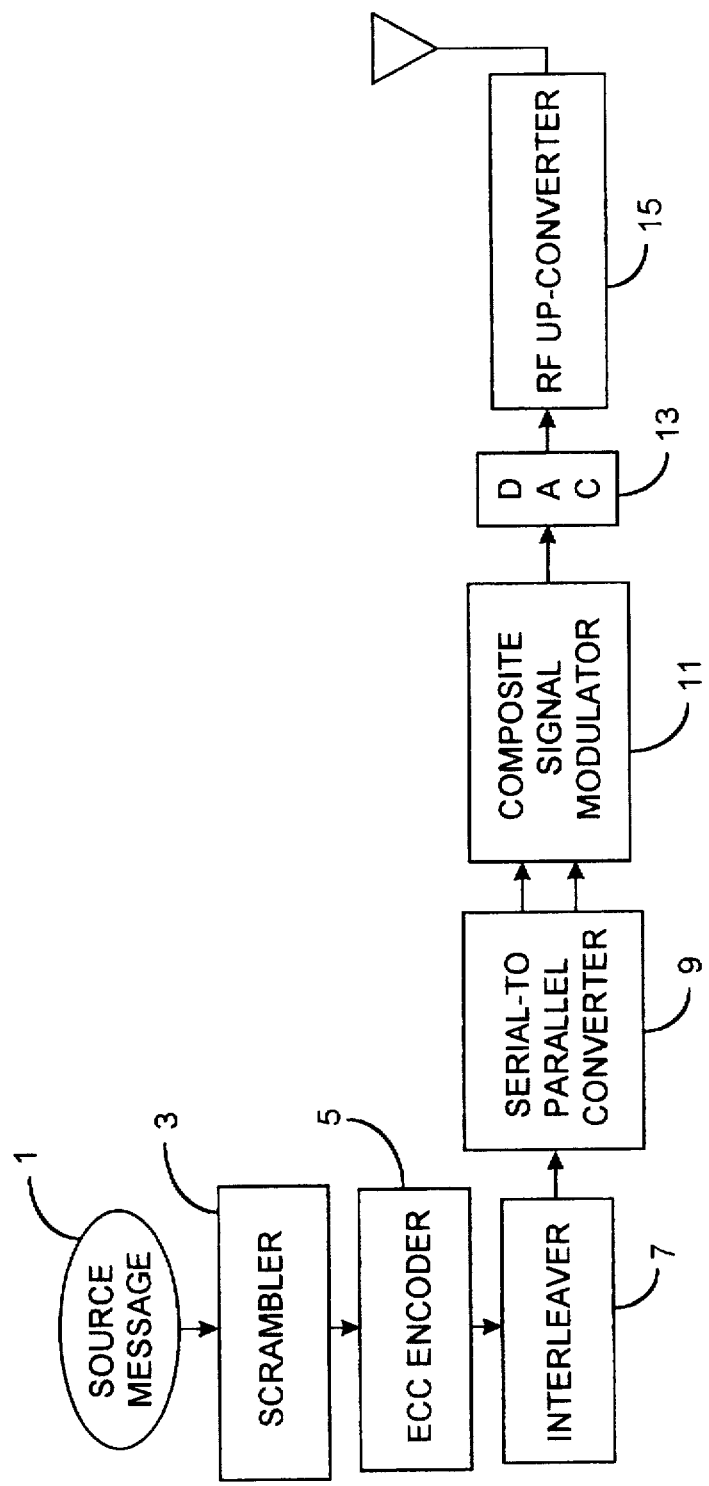
FIG. 1 is a prior art block diagram of a transmitter for a communication system with a composite subcarrier signal modulator with a simultaneously transmitted unmodulated reference signal.

Referring now more particularly to the accompanying drawings in which like reference numerals indicate like parts throughout the several views.

Figure 4:
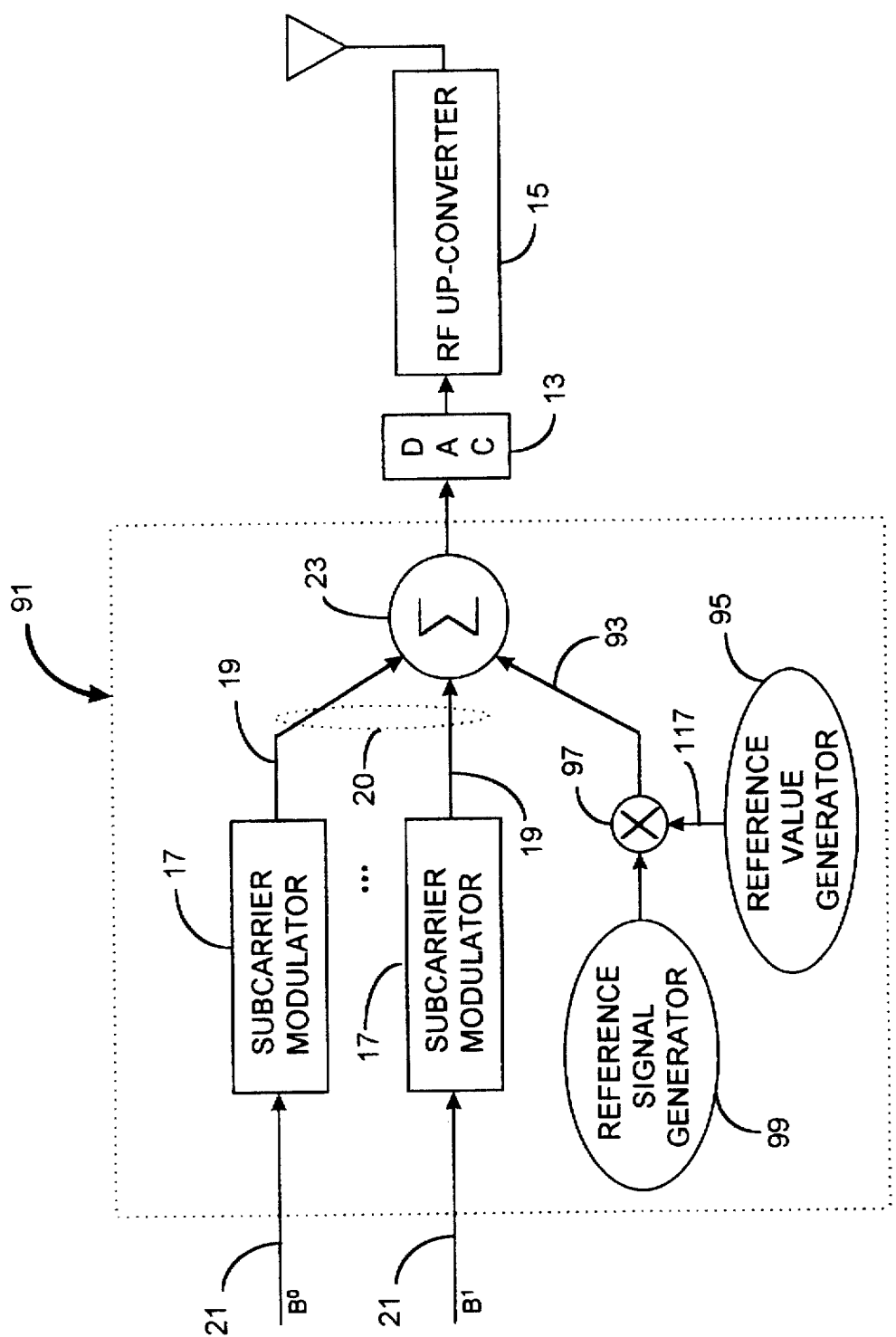
FIG. 4 is a block diagram of the composite signal modulator in the transmitter system according to an embodiment of this invention.

FIG. 4 is a block diagram of composite signal modulator 91, which replaces prior art composite signal modulator 11 in the FIG. 1 transmitter system. According to the invention, the remaining FIG. 1 transmitter functions which relate to the source message bit data are unaffected, for example, scrambling, ECC coding, and interleaving. In FIG. 4, the modulation of encoded source message bits 21 by subcarrier modulators 17 to generate respective modulated signals 19 and composite data-modulated subcarrier signal 20 is as in prior art FIG. 2. Furthermore, generated reference signal 93 is linearly summed with composite subcarrier signal 20 and propagated as an overall composite signal to DAC 13 and RF up-converter 15, as before.

Figure 2:
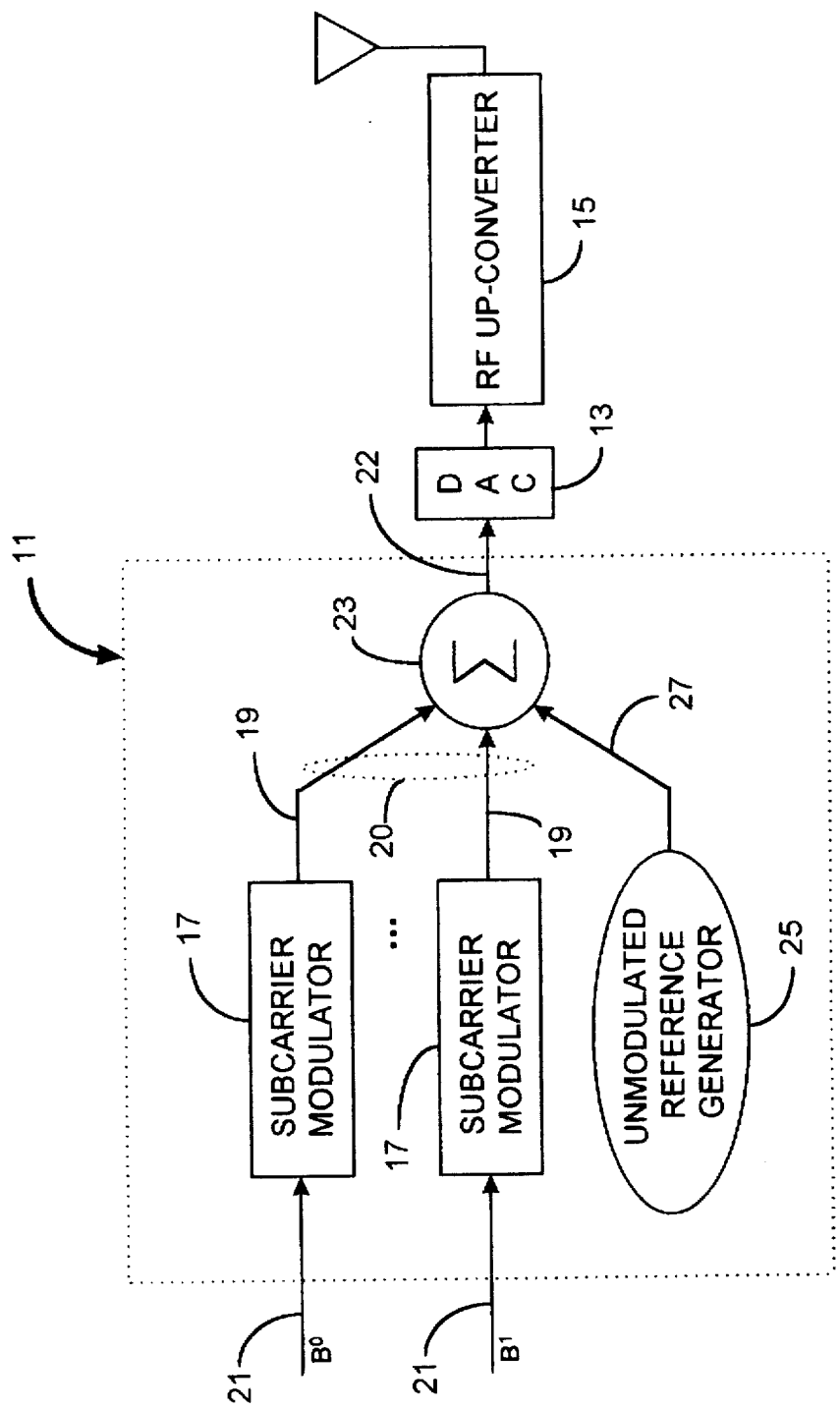
FIG. 2 is a block diagram of a prior art composite modulator in the FIG. 1 transmitter system. The composite modulator linearly sums the source message signal and the unmodulated reference signal.

However, in contrast to prior art FIG. 2, composite signal modulator 91 in FIG. 4 generates reference signal 93 by multiplying 97 the result of reference signal generator 99 with a varying value determined by reference value generator 95. Thus, reference signal 93 is modulated. According to certain embodiments of this invention, the values emitted from reference value generator 95 are constant for the duration of one reference signal baud interval, but vary from one reference signal baud interval to another in a predetermined manner. Furthermore, changes in emitted values 95 occur synchronous with the reference signal baud interval (i.e. at about the start of the reference signal waveform). Reference signal generator 99 prior to multiplication 97 may correspond to prior art unmodulated reference generator 25 in FIG. 2. The reference signal baud frequency is synchronous with the composite subcarrier signal baud frequency, and is equal to the composite signal baud frequency or an integer multiple or divisor thereof so that common synchronization methods may be implemented in the receiver system.

The values 117 emitted by reference value generator 95 determine some of the waveform characteristics of transmitted reference signal 93. The emitted values 117 are known without ambiguity (i.e. not random). In the preferred embodiment, the emitted values are one or multiple-bit digital values and multiplication 97 is implemented with a digital multiplier. The reference values may be generated by addressing a read-only-memory (ROM) device with an incrementing address generator (i.e. counter) or by use of a recurrence relation or by specific digital hardware, described later. In certain embodiments, for example, when the reference values are either positive or negative factors of one, multiplication 97 may be simplified and implemented as a conditional negation function for negative reference values and a conditional pass-through for positive unity reference values.

The sequence of values 117 which is emitted by value generator 95 repeats with a repetition rate defined as the "reference value" frequency, with a corresponding reciprocal reference value interval. According to certain embodiments, the reference value interval is a plurality of two or more reference signal baud intervals. Variation in the transmitted reference signal from one reference baud interval to another is a requirement of the transmitter according to certain embodiments of this invention.

The extent of transmitted reference signal 93 determines the amount of time over which the reference signal "probes" the RF channel while the bandwidth of reference signal 93 determines the probe frequency-range. In systems where the subcarrier modulators implement spread-spectrum modulation resulting spread signals 19 are typically robust to multipath delays (echoes) which occur within the composite subcarrier signal baud interval. However, the performance of spread-spectrum systems may be degraded by the presence of close-in echoes because the autocorrelation function for a spread spectrum signal decays rapidly away from the peak in the center, but may still be substantial near the center. A shorter reference signal (e.g. one-half of the subcarrier baud interval) may allow for faster updating of equalizer tap weights, which is important in mobile systems, while still probing the near-in multipath echoes. In other embodiments, the reference signal baud interval is typically substantially equal to the composite subcarrier baud interval.

A disadvantage of a shorter modulated reference signal baud interval compared to the data signaling interval for spread spectrum modulation of the subcarriers is that the reference signal alone is then insufficient to determine the proper phase relationship (i.e. centering) for the baud clock recovery. According to certain embodiments of this invention, when the reference signal baud interval is shortened compared to the composite subcarrier signal baud interval, the reference value interval is extended to cover the entire composite subcarrier signal baud interval. For example, if the reference signal baud interval is one-half of the subcarrier baud interval, the minimum repetition rate for the reference value sequence is two reference signal baud intervals.

By transmitting the shorter reference signal 93 with modulation, the received signal across the composite subcarrier baud interval is made distinct or unique, whereas without modulation, the received signal would be repetitive. The distinct reference signal shape across the entire composite signal baud interval facilitates the baud clock recovery algorithm, for example by tracking the position of the maximum crosscorrelation function magnitude. However, the advantages of a shorter reference signal baud interval for equalization and carrier frequency recovery (where fast updating is also important) is retained.

Figure 8:
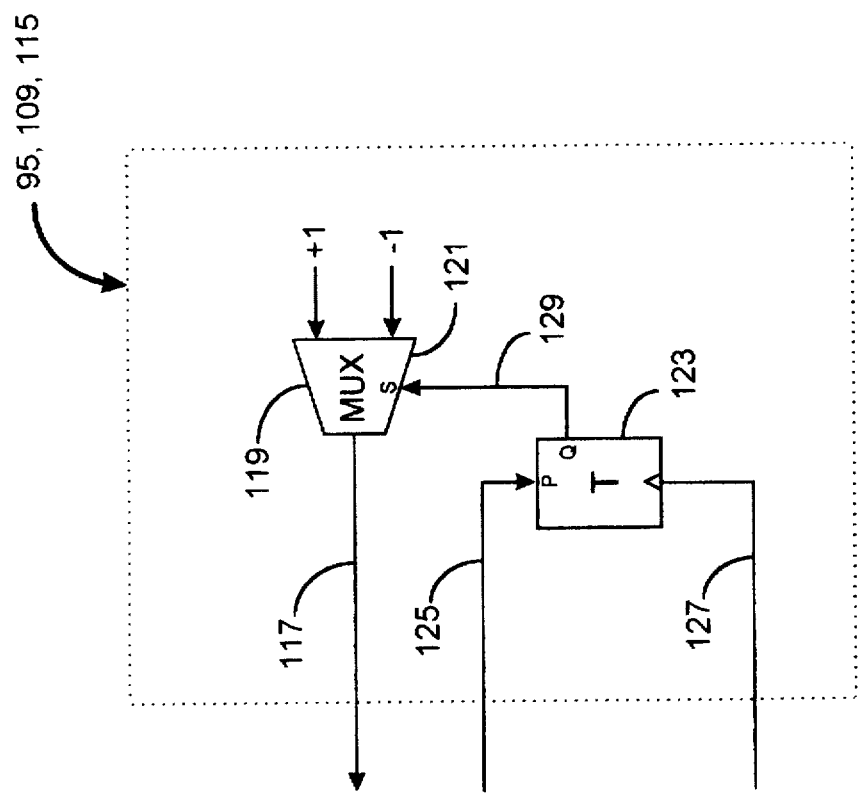
FIG. 8 is a block diagram of the reference value generator for the composite signal modulator in FIG. 4 and the compensated accumulator and composite signal demodulator in FIGS. 6–7, when the reference value sequence alternates in polarity for consecutive baud intervals.

A block diagram of a specific digital hardware embodiment for reference value generator 95 is shown in FIG. 8. A "toggle" (T) flip-flop device 123 is clocked by signal 127, which is a clock signal that is synchronous with the reference signal baud interval. The clock signal frequency is equivalent to the reference value frequency, as described previously. T flip-flop 123 may be a one-bit binary state machine, whose binary output value alternates between one and zero, changing state whenever the flip-flop is clocked by state changes in signal 127. T flip-flop 123 is pre-set to an arbitrary, but known state, either binary one or zero, by pre-set signal 125. The pre-set signal is exerted when the transmitter system is initialized so that output value 129 of T flip-flop 123 is a known state.

T flip-flop output value 129 is propagated to multiplexor 119. Multiplexor 119 is a switch which propagates one of a plurality of data inputs according to the pattern of one or a plurality of control bits. In the representation of a multiplexor in this disclosure, the control bit(s) input is designated with the label "S". Multiplexor 119 propagates as 117 either the value plus one (+1) or minus one (−1) according to T flip-flop output signal 129 value zero or one, respectively. The specific association (i.e. plus one for binary control zero and minus one for binary control one) between the binary value and value propagated by multiplexor 119 is arbitrary. The value 117 determined by multiplexor 119 is propagated or output beyond reference value generator 95 to multiplier 97 in FIG. 4. In certain embodiments, multiplier 97 is implemented as a conditional negation or pass-through. In this circumstance, T flip-flop output value 129 may directly control the conditional negation, for example, binary output value 129 of one for negation, and binary output value 129 of zero for pass-through.

The specific effect brought about by FIG. 8 reference value generator 95 and multiplier 97 is to cause transmitted reference signal 93 to alternate in signal polarity compared to unmodulated reference signal 99 for consecutive reference signal baud intervals. Hence, in this embodiment, the reference value interval (i.e. repetition rate) is two (2) reference signal baud intervals. The alternating reference signal polarity does not affect the power of the transmitted reference signal.

Figure 3:
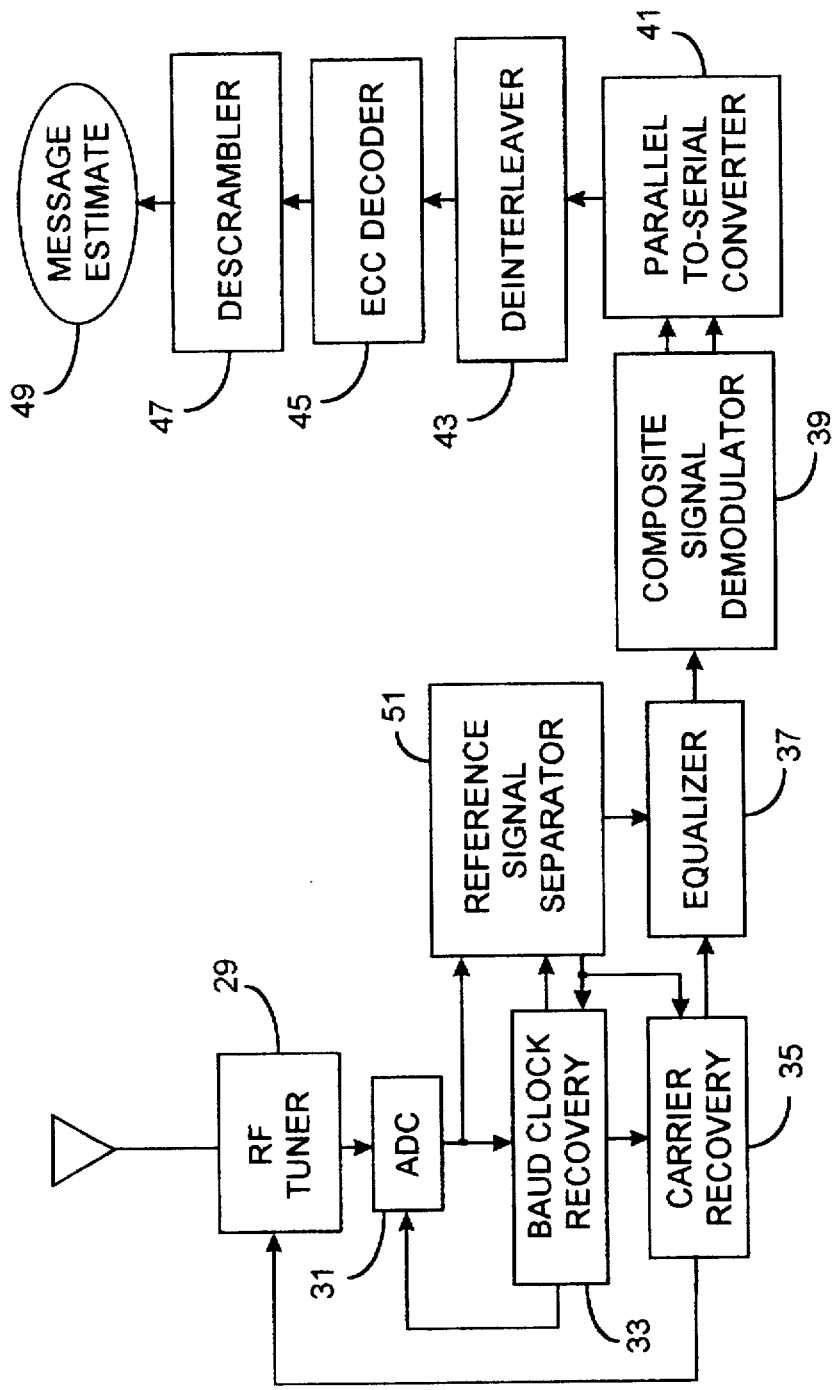
FIG. 3 is a prior art block diagram of a receiver for the FIG. 1 transmitter system with linear equalization.
Figure 5:
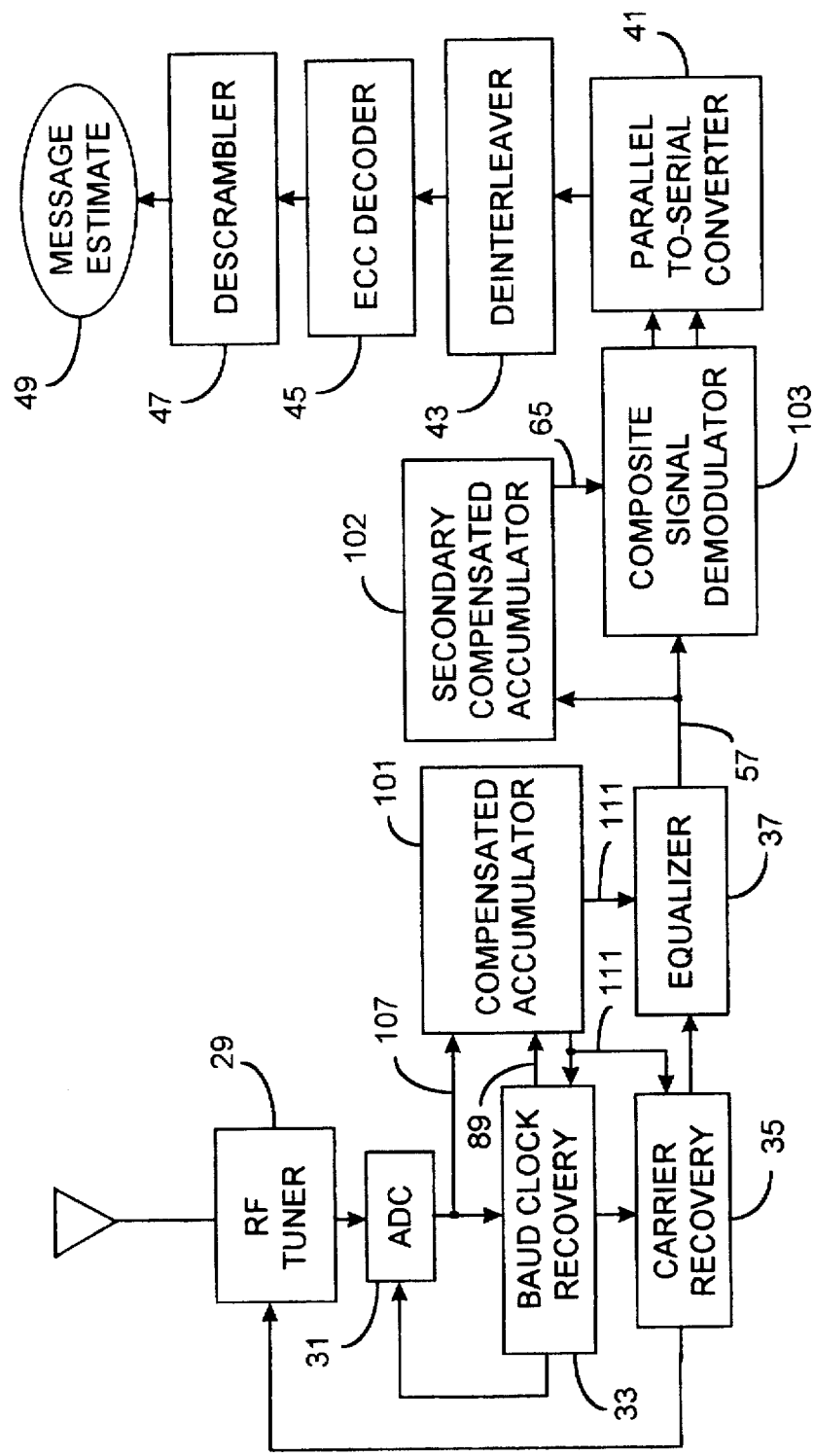
FIG. 5 is a block diagram of the receiver system for the FIG. 4 composite signal modulator.

When the reference signal 99 is multiplied 97 by the reference value sequence 117, according to the transmitter invention, the prior art reference signal receiver in FIG. 3 will typically not operate correctly. FIG. 5 is a block diagram of the receiver for the FIG. 1 transmitter system, but with the FIG. 4 composite signal modulator, including a reference signal 93 which varies across baud intervals. The FIG. 3 functions of tuning 29, ADC quantization 31, clock recoveries 33 and 35, and final demodulation processes of parallel-to-serial conversion 41 (for multiplexed systems), deinterleaving 43, ECC decoding 45, and descrambling 47 are unaffected by the use of the invention according to certain embodiments.

Figure 6:
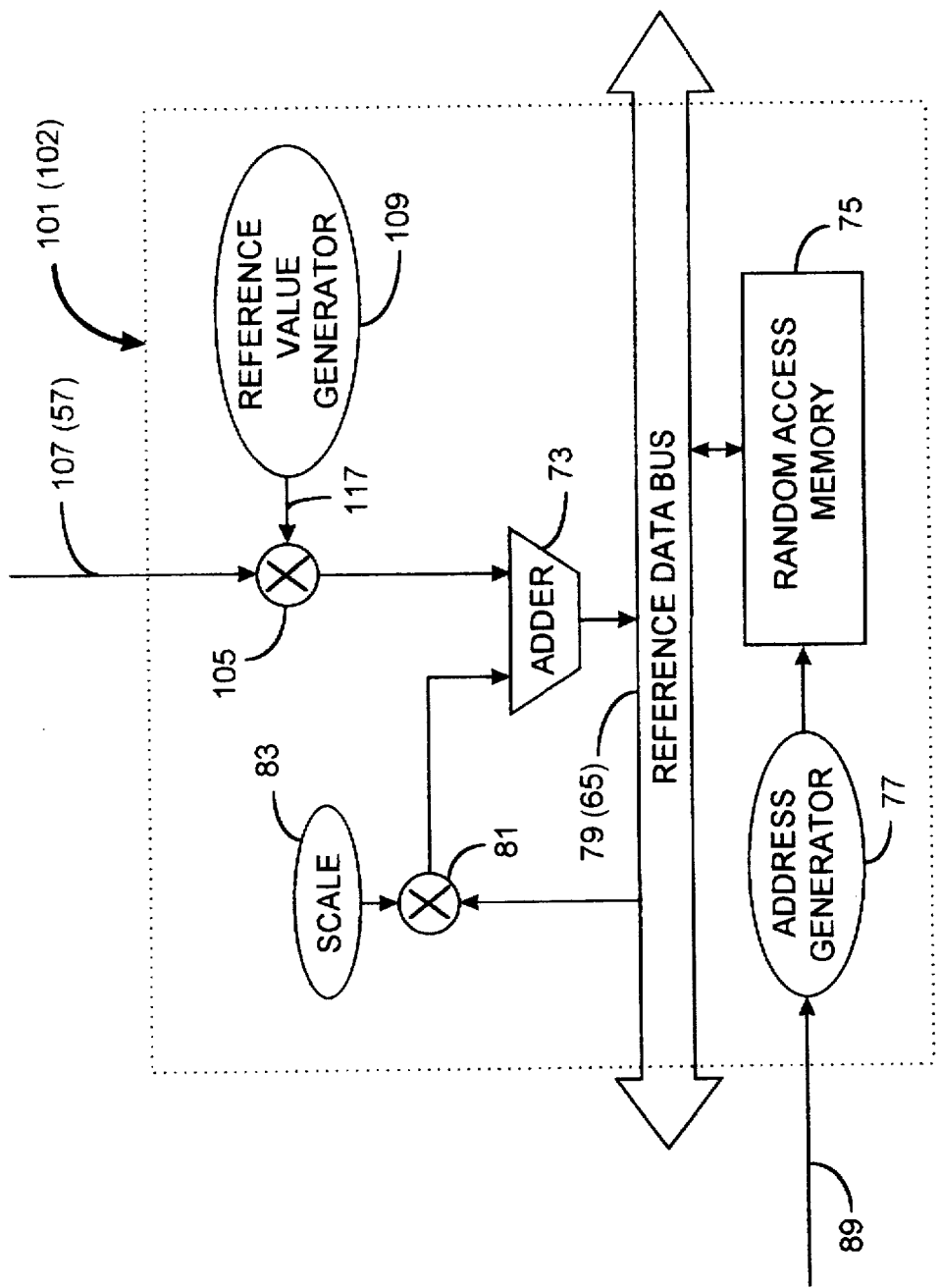
FIG. 6 is a block diagram of the compensated accumulator in the FIG. 5 receiver system.

FIG. 6 is a block diagram of compensated accumulator 101, which accomplishes reference signal separation by determining the reference signal estimate and discarding the composite subcarrier signal.

In certain embodiments of this invention, the receiver system includes secondary compensated accumulator 102 (see FIGS. 5–6) which removes the effect of the reference signal from equalized received composite signal 57, resulting in only the composite subcarrier signal, which may then be demodulated. The function of secondary compensated accumulator 102 is similar to that of compensated accumulator 101 except that the input signal for secondary compensated accumulator 102 is the sequence of equalized values 57. Furthermore, the result 111 of compensated accumulator 101 may be used in the implementation of clock recoveries 33 and 35 and/or equalizer tap-weight-update 37, while the result 65 of secondary compensated accumulator 102 may be used in composite subcarrier demodulator 103.

If reference signal 93 is frequency-orthogonal to the composite subcarrier signal 20, then the reference signal estimate may be determined by bandpass filtering the received signal. If reference signal 93 is time-orthogonal or time-multiplexed with the composite subcarrier signal 20, then the reference signal may be determined by gating the received signal. According to certain embodiments, reference signal 93 is not, in general, required to be frequency-orthogonal or time-orthogonal to composite subcarrier signal 20.

According to certain embodiments of this invention, reference signal 93 is linearly summed together with composite subcarrier signal 20 in the transmitter system. The component of the received composite signal which corresponds to the subcarrier composite signal varies significantly from one baud interval to another because the encoded source message appears approximately random, especially when scrambled. Then, the ADC values of the composite subcarrier signal which correspond to a particular instant in the baud interval will also be about random and with zero mean (e.g. for BPSK modulation of the encoded data). The repetitive summation of a sequence of sufficiently random numbers, with zero mean, is about zero.

When reference signal 93 is generated in a manner so that its repetitive summation over a plurality of baud intervals does not correspond to the value zero, then the reference signal may be separated from the composite subcarrier signal. The process of repetitive summation may be known as "accumulation". The accumulation operation is a vector operation; in other words, the received signals are added together across baud intervals. Thus, the result of the accumulation of the received signal is a further signal, which resembles the reference signal. The accumulated received signal is the reference signal estimate. In digital embodiments, the received signal consists of a plurality of, for example, L ADC samples in each baud interval. The accumulated reference signal is also a signal with L samples. Each sample in the accumulated reference signal is formed by averaging the corresponding sample in the received composite signal over a plurality of baud intervals. For proper operation of the accumulation function, corresponding ADC samples in consecutive baud intervals are summed together. In other words, the first sample of the first baud is summed with the first sample of the second baud; the second sample of the first baud is summed with the second sample of the second baud; and so on.

An advantage of the accumulation function is that it causes an effective increase in the SNR of the reference signal estimate at the receiver. This allows for the transmission of the reference signal with a lower signal energy than would otherwise be possible. The compromise in allocating the available transmitter power between the reference signal and the composite subcarrier signal in the transmitter system was discussed previously. The effect of accumulation is to increase the SNR of the received reference signal by an amount which corresponds to the number of baud intervals over which the received signal is averaged because, according to certain embodiments of this invention, the reference signal adds to itself coherently.

For example, if the accumulation function sums the received reference signal over a plurality of N baud intervals, then the SNR of the accumulated reference signal energy is increased by a factor of $10 \cdot \log_{10} N$ decibels for random, incoherent noise, which may represent a substantial increase (e.g. 10 decibels for only 10 averages). The SNR advantage allows for the transmission of reference signal 93 at a substantially decreased power when compared to a system without an accumulator. The resulting improvement in SNR increases as the number of baud intervals over which the accumulation is performed is increased. However, when the transmitter or receiver system is in motion relative to the other, the phase characteristics of the RF propagation channel are not stationary over long time intervals due to Doppler frequency variation. The amount of time over which the accumulation is performed must be short compared to the reciprocal of the maximum Doppler frequency spread, $2 \cdot v/\lambda$, where v is the relative velocity difference and $\lambda$ is the carrier wavelength. The maximum accumulation interval is also limited by the intrinsic phase instability of the frequency sources used to generate the clocks in the transmitter and receiver systems. For VHF frequencies, automobile velocities and commercial-grade frequency sources, the maximum accumulation interval may be less than about fifty milliseconds. In communication systems with very long baud intervals (i.e. close to the Doppler or phase-noise limits), the maximum number of baud intervals that may be accumulated may be small so that the apparent randomness of the composite subcarrier signal is reduced. In this circumstance, the composite subcarrier signal may disturb the accumulated reference signal estimate because it may not average out to about zero over the small number of accumulated baud intervals. To compensate for the short accumulation interval, the reference signal power may be increased in the transmitter to overcome the residual composite reference signal sum, but this is generally undesirable as it reduces the composite subcarrier signal power. In systems with very long baud intervals, the reference signal may be designed to be orthogonal or frequency-orthogonal to the composite subcarrier signal in order to mitigate the interference caused by the localized absence of randomness. The SNR benefit of the accumulation function is useful even when the reference signal is orthogonal or frequency-orthogonal to the composite subcarrier signal.

Accumulation separates the reference signal from the composite subcarrier signal because the subcarrier signal's components approximately cancel out when summed over a sufficient plurality of baud intervals, while the reference signal component adds coherently, resulting in the reference signal estimate with a scale factor increase. Two methods for linear accumulation are: "moving-average" (MA) and "autoregressive" (AR). In MA accumulation, the average is directly computed by summing the received signal samples over a plurality of N−1 previous baud intervals with the samples of the current baud interval. The received digital composite signal, representing the reference signal and subcarrier signal together, for baud interval i is indicated by $S^i_k$ where the subscript k is the ADC sample-index, with values between 0 and L−1, inclusive, for a baud with L ADC samples. The MA accumulation signal (sequence) at baud interval i for all sample-index values k is then computed as:

$$MA_k^i = \sum_{j=i-N+1}^{i} S_k^j \qquad (3)$$

The computation in Equation (3) may be simplified by storing the summed value $MA^i_k$ in addition to the ADC values $S^i_k$. Then, in order to update the sum $MA^i_k$ for the current ADC value, the Nth "oldest" ADC value (i.e. $S^{i-N}_k$) is subtracted from the previous sum $MA^{i-1}_k$ and the current ADC value $S^i_k$ is added to the sum. A disadvantage to MA accumulation is that it requires N·L memory locations in order to store the most recent (N−1) baud samples and the current baud samples. For large values of N, the memory requirement may not be desirable.

In AR accumulation, the average is indirectly determined by a recursive calculation. AR accumulation is also known as "leaky" integration and as a one-pole infinite-impulse response (IIR) filter. An advantage of AR accumulation is that it only requires a total of 2·N memory locations for the current baud interval and the previous reference signal estimate. AR accumulation also requires fewer computations than MA accumulation and has a particularly simple analog embodiment in the form of an RC-integrator. The AR accumulation at baud interval i for sample k is defined as:

$$AR_k^i = \beta \cdot AR_k^{i-1} + S_k^i \qquad (4)$$

In other words, the AR accumulation is progressively updated by summing the AR accumulation for the previous baud interval, weighted by scale factor β, with the current baud sample, for all samples in the baud. The primary disadvantage of the AR accumulation method is that unusually large baud samples may influence the accumulation for baud intervals well beyond the value of N, while in the MA accumulation method, the current sample may only affect future baud intervals within (N−1) intervals. The AR accumulation method approximates the function of the MA accumulation method. The value of positive constant β is less than one and determines the approximate number of baud intervals over which the AR accumulator operates. As the desired value of N increases, so does the value of β. For large values of N, β is determined approximately by:

$$\beta \approx 1 - \frac{1}{N} \quad (5)$$

The accuracy of Equation (5) degrades for small values of N. In general, the nominal value of β is determined by varying it and measuring the receiver error rate performance. Equations (3) and (4) omit an arbitrary normalization factor in order to make the accumulation represent a true average (i.e. ratio of the sum to the baud interval count). In general, the overall scale factor is unimportant in the accumulation function, and it may be implemented in those functional blocks which make use of the reference signal estimate by multiplication of the estimate by a positive constant value less than one (i.e. division). In order to simplify implementation of the division, β may be chosen to be a binary power.

The separation of the estimated reference signal from the received overall composite signal, which is composed of the baud ADC samples, in the receiver by direct implementation of MA or AR methods of accumulation is insufficient because of the modulation of reference signal 93 caused by multiplication 97 of the unmodulated reference signal 99 by the reference value sequence 117 in the transmitter system of the invention. The varying reference signal 93 disturbs the operation of the accumulation function in a manner which depends upon the characteristics of the values 117 generated by reference value generator 95.

For example, according to the reference value generator 95 embodiment in FIG. 8, with alternating polarity in consecutive baud intervals, MA accumulation of the received reference signal over a plurality of N baud intervals results in a reference signal estimate that is zero (no signal) for even values of N, and the reference signal with either positive or negative polarity for odd values of N, but without any SNR improvement. AR accumulation methods are similarly affected.

With reference to FIG. 6, according to certain embodiments of the invention, compensated accumulator 101 accumulates received signal 107 in order to determine the reference signal component, taking into consideration the multiplication 97 of the reference signal in the transmitter. If the function of secondary accumulation is required, the FIG. 6 embodiment of an accumulator is also used for secondary compensated accumulator 102, where input signal 57 is the equalized received signal (i.e. equalized form of signal 107).

After digitization by ADC 31, received composite signal 107, which includes the received varying reference signal and the composite subcarrier signal linearly summed together, is multiplied 105 in compensated accumulator 101 by the sequence of values 117 emitted by reference value generator 109. Reference value generator 109 in the receiver is implemented identical to reference value generator 95 in the transmitter, having the same repetition rate and being synchronous with the reference baud frequency. Multiplying 105 the received signal by the same reference values 117 as in the transmitter eliminates (cancels) the effect of the multiplication 97 on the reference signal in the transmitter system.

For example, in the embodiment where the transmitted reference signal 93 alternates in polarity in consecutive baud intervals (i.e. the FIG. 8 reference value generator), multiplying 105 the received signal 107 by values of plus one or minus one, also alternating in consecutive baud intervals, results in the coherent accumulation of the reference signal. If the unmodulated reference signal is represented by R(τ), the modulated transmitted reference signal for the FIG. 8 embodiment is $+R(\tau-\tau_B)$, $-R(\tau-2\tau_B)$, $+R(\tau-3\tau_B)$, $-R(\tau-4\tau_B)$, and so on, where $\tau_B$ is the reference baud interval. Multiplication 105 in the receiver by the synchronized reference value sequence +1, −1, +1, −1, and so on, results in the sequence $+R(\tau-\tau_B)$, $+R(\tau-2\tau_B)$, $+R(\tau-3\tau_B)$, $+R(\tau-4\tau_B)$, which may then be accumulated with the MA or AR methods. If the energy of the received reference signal in one baud is $P^R$, after the accumulation of N intervals, the energy is increased to $N^2 \cdot P^R$. The incoherent noise energy increases only by a factor of N, so that the SNR advantage of accumulation is preserved despite the modulation of the reference signal, according to certain embodiments of the invention.

After removing the effects of reference signal modulation in the receiver by multiplication 105, the reference signal estimate is determined by accumulation using MA or AR methods. FIG. 6 is a block diagram of a state-machine digital implementation of accumulator 101 using the AR method of accumulation with compensation for the varying reference signal. If there are a plurality of L ADC samples in each reference signal baud, then address generator 77 is a modulo-L integer counter which addresses random-access memory (RAM) 75. Address generator 77 is initialized by signal 89 so that the first memory value accessed in RAM 75 corresponds to the first sample in the baud interval, and so on. In other words, the accumulation is coherent across baud intervals. The plurality of L summations $AR^i_k$, as in Equation (4), which correspond to the state of the accumulation for the baud interval i are stored in RAM 75. Each of the L ADC samples in the received reference signal for the current baud, $S^i_k$ in Equation (4), having been multiplied 105 in the receiver in order to eliminate the effect of multiplication 97 in the transmitter system, is propagated to digital adder 73. The corresponding prior baud accumulation sample for index k, $AR^{i-1}_k$, is retrieved from RAM 75 and propagated to adder 73, but is first multiplied 81 by scale factor 83, which is the constant β in Equation (4). Any multiplying disclosed herein (e.g. 81, 105) of a scale factor or a reference value sequence may instead be replaced with division by the reciprocal thereof. Other arithmetic techniques with substantially similar results may also be used.

Adder 73 sums together the two input operands, $\beta \cdot AR^{i-1}_k$ and $S^i_k$. The result is the updated accumulation value for the specific index of the current baud and is propagated and written to the contents of RAM 75. The process is repeated for all L ADC samples in each baud interval (i.e., k values between 0 and L−1, inclusive) and repeats across baud intervals indefinitely. Reference data bus 79 is used to connect RAM 75 to adder 73 and multiplier 81. Bus 79 is also used to propagate the accumulated signal, which is estimated reference signal 111, beyond compensated accumulator 101, in order to make use of the recovered reference signal in baud clock recovery 33, carrier recovery 35, and/or equalizer 37.

If transmitted reference signal 93 is frequency-orthogonal to the subcarrier data-modulated signals 19 or if reference signal 93 is orthogonal and the RF channel is not frequency-selective, then it may not be necessary to remove the reference signal from the received overall composite signal prior to demodulation because of the filtering effect of the correlators implemented in the subcarrier demodulators. In this circumstance, the function of secondary accumulation 102 is not required and the composite signal demodulator is unaffected by the invention; in other words, the function of composite signal demodulator 103 and prior art composite signal demodulator 39 may be identical.

However, the reference signal 93 is not orthogonal or frequency-orthogonal to the received subcarrier signals according to certain embodiments. Even if the reference signal is orthogonal to the composite subcarrier signal in the transmitter system in the absence of distortion, frequency-selective distortion caused by the RF channel may significantly disturb the orthogonality property.

Reference signal 93 is summed together with the composite subcarrier signal 20 in the transmitter system. The reference signal may be removed from the overall received signal in the receiver system by subtracting the effect of the reference signal from the received composite signal. In certain embodiments of this invention, the removal of the reference signal component, prior to composite signal demodulation, is accomplished by composite signal demodulator 103, shown in FIG. 7. The subtraction function is implemented with summer 61, acting as a subtractor by having one of the inputs (denoted with a minus sign) negated prior to summation. Estimated equalized received reference signal 65 is determined in secondary compensated accumulator 102, whose function was described previously. Secondary compensated accumulator 102 may be required in a receiver system with equalization because the reference signal estimate determined prior to equalization by compensated accumulator 101 may be substantially different from the reference signal component in the equalized signal.

Reference signal estimate 111 determined by compensated accumulator 101 (unequalized) and equalized reference signal estimate 65, determined by secondary compensated accumulator 102 (equalized), are stripped of modulation in the implementation of the accumulator so as to resemble the unmodulated reference signal thereafter. Since the reference signal component in the received composite signal is modulated in the transmitter system, subtracting unmodulated equalized reference signal estimate 65 determined by secondary compensated accumulator 102 from equalized input signal 57 does not properly remove the reference signal from the received composite signal. Thus, the reference signal estimate is further processed prior to subtraction from the composite signal in the composite signal demodulator.

Figure 7:
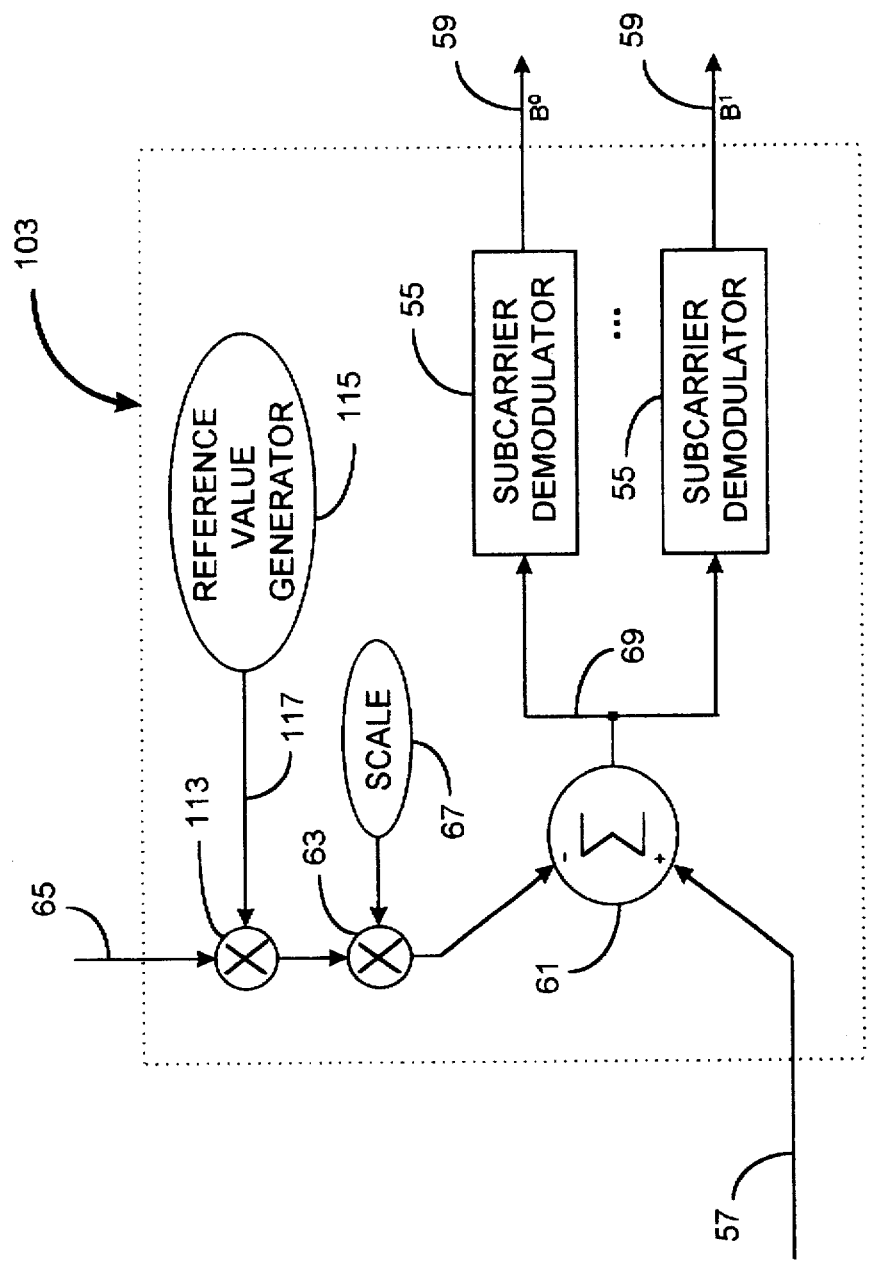
FIG. 7 is a block diagram of the composite signal demodulator, according to the invention, for the 5 receiver system.

In FIG. 7, equalized reference signal estimate 65, which has been stripped of the effects of transmitter modulation in the receiver by secondary compensated accumulator 102, is multiplied 113 by the result 117 of reference value generator 115, which together re-generate the modulation (i.e. multiplying) of the reference signal. The modulated and equalized reference signal estimate is then further scaled by multiplying 63 by constant scale factor 67 and then subtracting 61 from received signal 57. The implementation of reference value generator 115 is identical to reference value generator 95 in the modulator and reference value generator 109 in accumulator 101.

The purpose of scaling 63 and 67 the re-modulated reference signal estimate is to compensate for the accumulation scale-factor gain by attenuating the reference signal estimate. For example, if as the result of accumulation, the estimate amplitude is made larger than the received reference signal amplitude by a linear amplitude factor of two (2), then scale factor 67 is one-half (½). Scaling does not affect the SNR advantage of accumulation because although the amplitude is reduced by scaling, the distortion is similarly reduced.

In certain embodiments with robust equalization prior to composite signal demodulator, the reference component of received equalized signal 57 will substantially resemble the undistorted reference signal (i.e. as implemented in the transmitter system). In this circumstance, equalized reference signal estimate 65 may be replaced with a stored replica of the non-distorted, unmodulated reference signal, for example unmodulated reference generator 99 in the transmitter system, in the composite signal demodulator.

In FIG. 7, once the reference signal has been removed from the received signal, resulting in composite subcarrier signal 69, subcarrier demodulators 55 demodulate common input signal 69 to generate bit estimates 59. Each subcarrier demodulator 55 has a corresponding subcarrier modulator 17. The implementation of each subcarrier demodulator 55 depends upon the subcarrier modulation method, for example, Fast-Fourier Transform (FFT) processing for OFDM subcarrier signals. After removal of the reference signal component, the remaining processes required for subcarrier demodulation, for example, with spread spectrum methods and antipodal or biorthogonal modulation, are unaffected by use of the invention.

There are alternatives to the subtraction in the FIG. 7 composite signal demodulator which also remove the effect of the reference signal from the overall received composite signal. For example, the estimated unequalized reference signal, as determined in compensated accumulator 101 prior to equalization, may be removed (subtracted) from the composite signal with appropriate scaling prior to equalizer 37 in FIG. 5. The function of secondary compensated accumulator 102 is not required in this embodiment. It is also possible to remove the effects of the reference signal after the composite signal demodulator and prior to ECC decoding.

Figure 9:
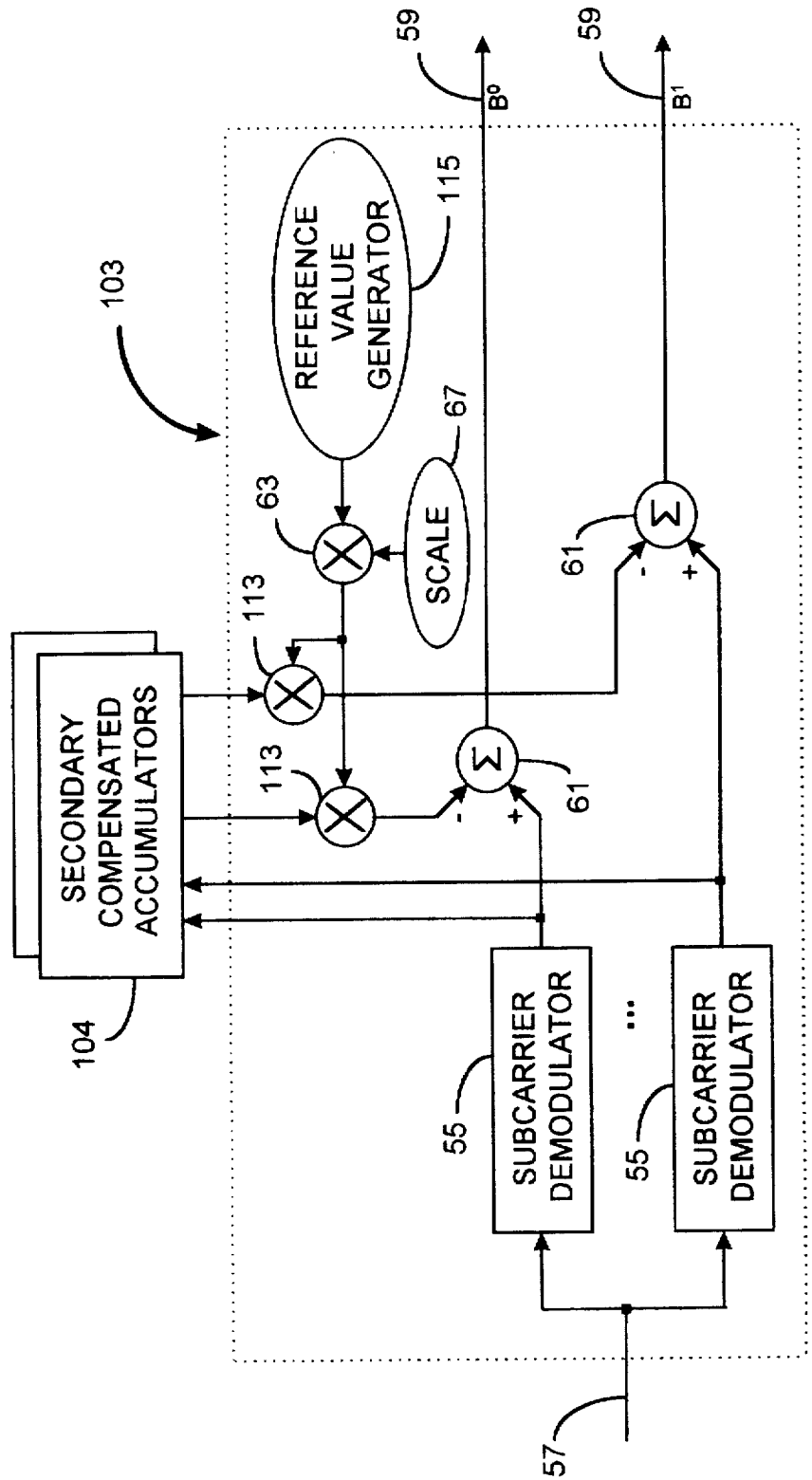
FIG. 9 is a block diagram according to another embodiment of this invention where the secondary accumulator(s) and subtraction processes occur after demodulation of the subcarrier signals, so that the bias effect caused by the reference signal is removed from the determined correlation sums.

In the FIG. 9 embodiment where the reference signal is not removed prior to demodulation by the subcarrier demodulators 55, and where subcarrier demodulators 55 are correlators (e.g. spread spectrum and OFDM methods of demodulation), the effect of the reference signal is to cause an offset in the determined correlation value (sum) leaving the demodulators. The correlation sum offset typically varies for each subcarrier demodulator 55 because the interaction between the reference signal and each of the subcarrier signals usually varies with the shape of the subcarrier signal waveform. The offset in the correlation sum may be known as a "bias". The bias caused by the presence of the reference signal component in the composite subcarrier signal varies across baud intervals because of the modulation of the reference signal in the transmitter system. Thus, the bias may not be properly determined by just averaging the correlation sums over a plurality of baud intervals. However, an estimate of the bias may be determined using compensated accumulator 104 shown in FIG. 9 which is similar to the implementation of compensated accumulators 101 and 102 in the previous figures.

For each subcarrier demodulator 55 in FIG. 9, a replica of the correlation sum determined by demodulator 55 is multiplied by the reference value sequence and accumulated over a plurality of baud intervals in accumulator(s) 104. The accumulation of the correlation sums in accumulator(s) 104 due to the subcarrier signals which represent the encoded bit values will approximately cancel out and result in about zero if the encoded bit data is sufficiently random and if a sufficient number of baud intervals are included in the accumulation process. The value remaining after accumulation is an estimate of the bias. In general, the bias estimate must be determined for each subcarrier signal independently so that there are a plurality of correlation sum accumulators 104 in FIG. 9, which generate a corresponding plurality of bias estimates. The correlation sum accumulators 104 differ from compensated accumulator 101 and secondary compensated accumulator 102 because the length of the sequence which is accumulated for the correlation sums is a single scalar value per baud (i.e. the correlation sum) for each subcarrier signal. Once the bias estimate is determined and propagated from secondary accumulator(s) 104, it is multiplied 113 by the reference value sequence, which is scaled in order to compensate for accumulation gain, and then subtracted 61 from the corresponding correlation sum determined by each of the subcarrier demodulators 55. scaling in FIG. 9 is carried out as in FIG. 7 by way of reference value generator 115 which outputs the reference sequence to be multiplied at 63 by scale factor 67. The resulting value is forwarded to the bias estimates of each accumulator 104 for multiplication 113 which re-modulates the bias estimate for subtraction 61 from the correlation sums determined by demodulators 55. Bit estimates $B_0$ and $B_1$ at 59 result. In an alternative embodiment, scaling 63 and 67 may be implemented after multiplier 113 and prior to subtraction 61.

With reference to FIG. 8, the embodiment of the invention, with reference value generators 95, 109, and 115 implemented as in FIG. 8, substantially mitigates the deleterious effect of offsets, stationary interference, and even-order nonlinearities on the received reference signal estimate. The FIG. 8 reference value generator causes the transmitted reference signal to alternate in polarity in consecutive baud intervals (i.e. positive, negative, positive, negative, and so on). In the transmitter system, if the reference signal without modulation for the duration of one reference baud interval is $T^B(\tau)$, then the transmitted reference signal of the invention over a plurality of baud intervals is $T(\tau)$, which is given by:

$$T(\tau)=+T^B(\tau), -T^B(\tau-\tau_B), +T^B(\tau-2\tau_B), -T^B(\tau-3\tau_B) \quad (6)$$

where $\tau_B$ is the reference signal baud interval. Even-symmetric (i.e. powers of two, four, six, and so on) nonlinearities do not preserve the polarity asymmetry of the reference signal. For circumstances where square-law (power-of-two) nonlinearities are dominant, the even-symmetric reference signal contribution due to nonlinearity distortion in the transmitted reference is $T^2(\tau)$, which is given by:

$$T^2(\tau)=+T^B(\tau)^2, +T^B(\tau-\tau_B)^2, +T^B(\tau-2\tau_B)^2, +T^B(\tau-3\tau_B)^2, \quad (7)$$

The overall transmitted reference signal is the sum of Equation (6) with Equation (7) weighted by the nonlinearity amplitude scale factor, which depends upon the implementation of the nonlinear components (e.g. power-amplifier in the transmitter system). In the receiver system according to certain embodiments of this invention, compensated accumulator 101 multiplies 105 the received signal, which includes the reference signal linear and nonlinear components, by a sequence of alternating polarity values (+1, −1, +1, −1, and so on), prior to accumulation. Transmitted reference signal $T(\tau)$ becomes received reference signal $R(\tau)$ and transmitted nonlinear distortion signal $T^2(\tau)$ becomes received nonlinear distortion $R^2(\tau)$. In the absence of other forms of distortion, these are given by:

$$R(\tau)=+T^B(\tau), +T^B(\tau-\tau_B), +T^B(\tau-2\tau_B), +T^B(\tau-3\tau_B), \quad (8)$$

$$R^2(\tau)=+T^B(\tau)^2, -T^B(\tau-\tau_B)^2, +T^B(\tau-2\tau_B)^2, -T^B(\tau-3\tau_B)^2, \quad (9)$$

The accumulation of Equation (8) over a plurality of baud intervals in the receiver generates the desired reference signal estimate, with a SNR improvement relative to the reference signal energy in one baud interval. However, the accumulation of Equation (9), which is the undesired nonlinear distortion, results in the value zero (0) for an even number of baud accumulations and only $T^B(\tau)^2$ for an odd number of baud accumulations by the MA method. Similar results apply for the AR method. Thus, the effect of even-symmetric nonlinearities is substantially eliminated. Odd-symmetric nonlinear distortion is unaffected by use of the invention.

A similar effect occurs for slowly-varying stationary interference and DC-offsets in the receiver system implementation. With reference to Equation (7), which is the transmitted reference, slowly-varying interference or offsets in the receiver system are modeled as the summation of the desired transmitted reference signal with a constant distortion term $N^D(\tau)$. The distortion term $N^D(\tau)$ is unrelated to the transmitter system and does not substantially change over the duration of the accumulation. Thus, the received reference signal is given by $+R(\tau)+N^D(\tau), -R(\tau-\tau_B)+N^D(\tau), +R(\tau-\tau_B)+N^D(\tau), -R(\tau-\tau_B)+N^D(\tau)$, and so on. After multiplication by alternating polarity value sequence +1, −1, +1, −1, and so on, in the compensated accumulator in the receiver, the resulting signal is given by $+R(\tau)+N^D(\tau), +R(\tau)-N^D(\tau), +R(\tau-\tau_B)+N^D(\tau), +R(\tau-\tau_B)-N^D(\tau)$, and so on, which is subsequently accumulated. While the desired reference signal component $R(\tau)$ adds coherently for each baud in the accumulation interval, thus providing the accumulation SNR gain, the effects of the slowly varying distortion $N^D(\tau)$ approximately cancel out. The FIG. 8 specific embodiment of the reference value generator is not the only implementation of this invention that possesses this desirable effect as certain other varying reference signals will suffice; however, it is the shortest and has the advantage of a simple implementation with a T flip-flop. In general, all reference value sequences which substantially alternate in polarity over the accumulation interval will reduce the effects of stationary interference, offsets, and even-symmetric nonlinearities in the receiver system. The invention SNR advantage on stationary interference, offsets, and nonlinearity is typically larger than the SNR advantage on random noise because of the coherent cancellation.

The reference signal multiplication 97 in the transmitter may affect the baud clock recovery function 33 if the recovery function makes use of the reference signal estimate. Once baud frequency synchronization is accomplished, the reference signal is separated by the compensated accumulator, as described previously. However, during initial receiver acquisition, the starting phase of the signal received from the transmitter is arbitrary relative to the receiver's clock. As a result, the reference value generator is not necessarily synchronous with the transmitted signal, and changes in the reference values may occur at any instance in the baud interval, for example, in the middle of the interval. With the FIG. 8 reference value generator embodiment, the received signal may be "chopped" by polarity changes about the center of the baud. The effect of the distorted received reference signal upon baud clock synchronization depends upon the recovery algorithm. For an algorithm where the position of the maximum crosscorrelation function magnitude is tracked and caused to be centered by varying the baud clock frequency, the distortion caused by polarity changes at arbitrary instances in the received signal may result in inaccurate determinations of the actual maximum value position (i.e. the one determined had there been no modulation of the reference signal) during initial acquisition. However, as the reference signal precesses closer to the nominal phase, the distortion decreases. As the nominal phasing is approached, the maximum magnitude of the crosscorrelation function increases. This change in crosscorrelation magnitude does not occur where the reference signal is unmodulated. Thus, according to certain embodiments of this invention, a result of the modulation of the reference signal is that the maximum value of the correlation magnitude function itself provides useful synchronization information in addition to the position information, whereas in the prior art, only the position of the maximum value is useful.

The determination of the specific reference signal 93 waveform depends upon the method of modulation implemented in the subcarrier modulators. The use of this invention does not require a particular reference signal shape. The unmodulated reference signal 99 (i.e. prior to multiplication) may be a pseudonoise sequence (a.k.a. PN, m-ary, maximal length) or variation (Gold codes, Kasami codes, Barker codes). The reference signal 93 may alternatively be composed of all or parts of the subcarrier signals 19 without or with constant, unvarying modulation. The reference signal may be unrelated to the composite signal (e.g. FM-chirp signal or sinusoidal pilot). When the reference signal is used for equalization, it is advantageous if the shape of the reference signal resembles the shape of the spectrum of the composite subcarrier signal. For wideband composite subcarrier signals and wideband reference signals, it is preferable that reference signal 93 is orthogonal or approximately-orthogonal (AO) to all of the subcarrier signals 19. Orthogonal signals may be generated by known numerical methods such as the Gram-Schmidt procedure [reference: G. R. Cooper and C. D. McGillem. *Modern Communications and Spread Spectrum*. New York: McGraw-Hill, Inc., 1986, pp. 206≧209] or matrix eigenvector solutions.

The multiplication 97 of the reference signal in the transmitter may cause an expansion of the bandwidth occupied by the reference signal if the reference signal is made discontinuous at the instant when the reference values change. It is preferable if the reference signal is about zero towards to the edges of the reference signal interval (i.e. coincident with changes in the reference values) or, at least, that the reference signal extent is sufficiently long so that the region of discontinuity is small, for example, less than 1/10 of the total reference signal baud interval.

The multiplication 97 of the reference signal by the alternating reference value sequence 117, according to certain embodiments of this invention, may cause a polarity ambiguity in the determined reference signal estimate. If the baud recovery algorithm makes use of only magnitude information, ignoring reference signal estimate polarity, then the reference signal may be accumulated with the incorrect polarity, for example, $-R(\tau)$ instead of $R(\tau)$, because the receiver may be synchronized with the transmitter one hundred and eighty degrees (180°) out-of-phase with respect to the reference value baud interval. In this circumstance, although an adaptive equalizer will correct for the inversion of the signal, the resulting bit estimates which depend upon coherent demodulation may have the incorrect polarity (i.e. ones and zeroes interchanged). If the modulation method is insensitive to absolute polarity values, for example, by using Differential Phase Shift Keying (DPSK) and its variations, the polarity inversion may not require further processing. Furthermore, if convolutional error encoding is used, then the tail bits which are used to flush out the ECC encoder memory provide polarity information. Typically, the tail bits are encoded as all zeroes in the transmitter so that the detection of all ones in the decoded tail bits in the receiver indicates that there may be a polarity inversion. Once an inversion is detected, the bit estimates may be negated to restore the nominal values.

In certain embodiments, the reference signal is transmitted in order to determine the RF channel propagation characteristics at the receiver without the simultaneous transmission of a source message signal. In this circumstance, the use of a varying reference signal according to the invention is advantageous because it reduces the effect of stationary interference, offsets, and nonlinearity on the recovered reference signal so that the remaining distortion of the reference signal is due substantially to the RF channel propagation characteristics.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A communications system including a transmitter and a receiver which utilizes a modulated reference signal in order to reduce the effects of non-linearity and stationary interference on the recovery of the reference signal, the communications system comprising:

a transmitter including at least one subcarrier modulator for generating at least one data modulated signal;

said transmitter further including means for generating a modulated reference signal which varies from reference signal baud interval to reference signal baud interval in a predetermined manner based upon a sequence of reference values;

a summer in said transmitter for summing the modulated reference signal and the at least one data modulated signal to form an overall composite signal;

means for transmitting the overall composite signal from the transmitter to a receiver, the receiver including:

(i) means for cancelling the effect of the modulation of the reference signal thereby forming a substantially unmodulated reference signal;

(ii) a first accumulator for accumulating the unmodulated reference signal in order to determine a reference signal estimate; and (iii) means for using said reference signal estimate for at least one of: facilitating baud clock recovery; facilitating carrier frequency recovery; and equalization.

2. The system of claim 1, further comprising a second accumulator in the receiver for receiving an equalized input signal and outputting to a demodulator an equalized unmodulated reference signal estimate, said demodulator using the equalized unmodulated reference signal estimate in order to substantially cancel the effect of the reference signal in the subcarrier signal, said demodulator further including reference signal re-modulation means and scaling means for compensating for accumulation scale-factor gain.

3. A method of transmitting an overall composite signal to a receiver including a data modulated signal and a varying reference signal, the method comprising the steps of:

modulating source message bits so as to generate the data modulated subcarrier signal;

generating a modulated reference signal which varies from reference signal baud interval to reference signal baud interval in a predetermined manner as a function of a sequence of reference values thereby reducing the effects of non-linearity and stationary interference on the recovery of the reference signal in the receiver;

summing the data modulated signal and the modulated reference signal to form an overall composite signal; and transmitting the overall composite signal to the receiver.

4. The method of claim 3, wherein said modulating step further includes generating a plurality of data modulated subcarrier signals and said summing step includes summing the plurality of data modulated subcarrier signals and the modulated reference signal to form the overall composite signal.

5. A method of receiving an overall composite signal including a modulated reference signal and a data modulated signal, the reference signal having been modulated in a corresponding transmitter, the method comprising the steps of:

receiving the overall composite signal including the data modulated signal, and the modulated reference signal which varies from reference signal baud interval to reference signal baud interval in a predetermined manner;

substantially cancelling the effect of the modulation in the reference signal so as to form a substantially unmodulated reference signal;

accumulating the unmodulated reference signal in order to determine a reference signal estimate; and using the reference signal estimate to facilitate at least one of equalization, carrier recovery, and baud clock recovery thereby reducing the effects of at least one of non-linearity and stationary interference on the recovery of the reference signal in the receiver.

6. The method of claim 5 further comprising the steps of:

using the reference signal estimate in equalizing the received signal thereby forming an equalized signal;

cancelling the effect of the reference modulation in the equalized signal to form an equalized substantially unmodulated reference signal; and accumulating the equalized unmodulated reference signal so as to determine an equalized reference signal estimate.

7. The method of claim 6 further comprising the steps of:

re-modulating the equalized reference signal estimate to form a re-modulated reference signal estimate;

scaling the re-modulated reference signal estimate in order to compensate for accumulation scale factor gain thereby determining a scaled re-modulated reference signal estimate;

determining a subcarrier signal using the scaled re-modulated reference signal estimate to substantially cancel the effect of the reference signal in the equalized signal; and demodulating the subcarrier signal in order to determine a bit estimate.

8. A receiver for receiving an overall composite signal including a varying reference signal and at least one data modulated signal, the reference signal varying from reference signal baud interval to reference signal baud interval in a predetermined manner as determined by a sequence of reference values in a corresponding transmitter, the receiver comprising:

means for receiving the overall composite signal including the varying reference signal and a data modulated signal;

means for cancelling the effect of the sequence of references values in the reference signal so as to form a non-varying reference signal;

an accumulator for accumulating the non-varying reference signal in order to determine a reference signal estimate; and means for using the reference signal estimate for one of clock synchronization and equalization.

9. The receiver of claim 8 further comprising:

an equalizer for equalizing the received signal using the reference signal estimate thereby forming an equalized signal;

means for canceling the effect of the reference sequence in the equalized signal thereby forming an equalized substantially non-varying reference signal; and a secondary accumulator for accumulating the equalized non-varying reference signal thereby forming an equalized reference signal estimate.

10. The receiver of claim 9 further comprising a subcarrier demodulator for determining data bit estimates from the data modulated signal, said subcarrier demodulator including a re-varying device for re-varying the equalized reference signal estimate using the sequence of reference values thereby forming a varying equalized reference signal estimate.

11. The receiver of claim 10 wherein said subcarrier demodulator includes means for scaling the varying equalized reference signal estimate and determining a subcarrier signal from the equalized signal and the varying equalized reference signal estimate, said demodulator further comprising means for determining the bit estimates from the determined subcarrier signal.

12. The method of claim 1 further comprising the step of A method of receiving and processing a composite signal including a data modulated signal and a modulated reference signal, the reference signal being modulated in a corresponding transmitter, the method comprising the steps of:

receiving the composite signal including the data modulated signal and the modulated reference signal which varies in a predetermined manner;

substantially cancelling the effect of the modulation of the received reference signal thereby determining a first reference signal estimate;

using the first reference signal estimate for facilitating one of equalization and synchronization;

determining a re-modulated reference signal estimate;

using the re-modulated reference signal estimate in determining a subcarrier signal; and scaling the re-modulated reference signal estimate before using the re-modulated estimate to determine the subcarrier signal.

13. The method of claim 12 further comprising the steps of A method of receiving and processing a composite signal including a data modulated signal and a modulated reference signal, the reference signal being modulated in a corresponding transmitter, the method comprising the steps of:

receiving the composite signal including the data modulated signal and the modulated reference signal which varies in a predetermined manner;

substantially cancelling the effect of the modulation of the received reference signal thereby determining a first reference signal estimate;

using the first reference signal estimate for facilitating one of equalization and synchronization;

equalizing the received composite signal so as to form an equalized signal; and substantially cancelling the effect of the reference signal in the equalized signal by using one of (i) a stored replica of the reference signal; and (ii) an equalized unmodulated reference signal estimate.

14. A method of receiving and processing a modulated reference signal from a transmitter, the method comprising the steps of:

receiving the modulated reference signal which varies from reference signal baud interval to reference signal baud interval as determined by a sequence of reference values in the transmitter;

substantially cancelling the effect of the modulation of the reference signal so as to form a substantially unmodulated reference signal;

accumulating the substantially unmodulated reference signal in order to determine a reference signal estimate thereby reducing the effect of non-linearity on the recovery of the reference signal; and using the determined reference signal estimate for at least one of equalization, synchronization, and channel characteristic determination.

* * * * *